(12) United States Patent
Kothari et al.

(10) Patent No.: US 7,453,579 B2
(45) Date of Patent: Nov. 18, 2008

(54) MEASUREMENT OF THE DYNAMIC CHARACTERISTICS OF INTERFEROMETRIC MODULATORS

(75) Inventors: Manish Kothari, Cupertino, CA (US); Yongkang Tang, Campbell, CA (US); Brian J. Gally, Los Gatos, CA (US); William J. Cummings, Millbrae, CA (US)

(73) Assignee: IDC, LLC, San Francisco, CA (US)

( * ) Notice: Subject to any disclaimer, the term of this patent is extended or adjusted under 35 U.S.C. 154(b) by 322 days.

(21) Appl. No.: 11/223,824

(22) Filed: Sep. 9, 2005

(65) Prior Publication Data

US 2006/0077401 A1    Apr. 13, 2006

Related U.S. Application Data

(60) Provisional application No. 60/613,537, filed on Sep. 27, 2004.

(51) Int. Cl.
*G01B 9/02* (2006.01)

(52) U.S. Cl. .................................. 356/519; 359/237

(58) Field of Classification Search .................. 356/519
See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,653,741 A | 4/1972 | Marks | |
| 3,656,836 A | 4/1972 | de Cremoux et al. | |
| 3,813,265 A | 5/1974 | Marks | |
| 3,899,295 A | 8/1975 | Halpern et al. | |
| 3,955,880 A | 5/1976 | Lierke | |
| 4,001,808 A | 1/1977 | Ebihara et al. | |
| 4,099,854 A | 7/1978 | Decker et al. | |
| 4,224,565 A | 9/1980 | Sosniak et al. | |
| 4,228,437 A | 10/1980 | Shelton | |
| 4,377,324 A | 3/1983 | Durand et al. | |
| 4,389,096 A | 6/1983 | Hori et al. | |

(Continued)

FOREIGN PATENT DOCUMENTS

CH          685887 A5     10/1995

(Continued)

OTHER PUBLICATIONS

Akasaka, "Three-Dimensional IC Trends," Proceedings of IEEE, vol. 74, No. 12, pp. 1703-1714 (Dec. 1986).

(Continued)

*Primary Examiner*—Tarifur R Chowdhury
*Assistant Examiner*—Jonathon D Cook
(74) *Attorney, Agent, or Firm*—Knobbe Martens Olson & Bear LLP

(57) ABSTRACT

Various systems and methods of lighting a display are disclosed. In one embodiment, for example, a method includes applying a voltage waveform to the interferometric modulators, applying a voltage pulse to the interferometric modulators, detecting reflectivity of light from the interferometric modulators, and determining one or more quality parameters of the interferometric modulators based on the detecting reflectivity of light, where the applied voltage pulse causes the interferometric modulators to vary between an actuated and a non-actuated state, or an non-actuated state and an actuated state.

73 Claims, 18 Drawing Sheets

U.S. PATENT DOCUMENTS

| | | |
|---|---|---|
| 4,403,248 A | 9/1983 | te Velde |
| 4,441,791 A | 4/1984 | Hornbeck |
| 4,445,050 A | 4/1984 | Marks |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,897,360 A | 1/1990 | Guckel et al. |
| 4,954,789 A | 9/1990 | Sampsell |
| 4,956,619 A | 9/1990 | Hornbeck |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,142,405 A | 8/1992 | Hornbeck |
| 5,148,503 A * | 9/1992 | Skeie ............................ 385/3 |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,175,772 A | 12/1992 | Kahn et al. |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,296,950 A | 3/1994 | Lin et al. |
| 5,305,640 A | 4/1994 | Boysel et al. |
| 5,307,139 A | 4/1994 | Tyson, II et al. |
| 5,311,360 A | 5/1994 | Bloom et al. |
| 5,312,513 A | 5/1994 | Florence et al. |
| 5,323,002 A | 6/1994 | Sampsell et al. |
| 5,325,116 A | 6/1994 | Sampsell |
| 5,327,286 A | 7/1994 | Sampsell et al. |
| 5,331,454 A | 7/1994 | Hornbeck |
| 5,339,116 A | 8/1994 | Urbanus et al. |
| 5,365,283 A | 11/1994 | Doherty et al. |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,409 A | 10/1995 | Henley et al. |
| 5,459,602 A | 10/1995 | Sampsell |
| 5,459,610 A | 10/1995 | Bloom et al. |
| 5,461,411 A | 10/1995 | Florence et al. |
| 5,489,952 A | 2/1996 | Gove et al. |
| 5,497,172 A | 3/1996 | Doherty et al. |
| 5,497,197 A | 3/1996 | Gove et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,510,914 A * | 4/1996 | Liu et al. .................... 349/136 |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |
| 5,619,366 A | 4/1997 | Rhoads et al. |
| 5,636,052 A | 6/1997 | Arney et al. |
| 5,646,768 A | 7/1997 | Kaeiyama |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,703,710 A | 12/1997 | Brinkman et al. |
| 5,710,656 A | 1/1998 | Goosen |
| 5,729,245 A | 3/1998 | Gove et al. |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |
| 5,818,095 A | 10/1998 | Sampsell |
| 5,825,528 A | 10/1998 | Goosen |
| 5,835,255 A | 11/1998 | Miles |
| 5,842,088 A | 11/1998 | Thompson |
| 5,912,758 A | 6/1999 | Knipe et al. |
| 5,986,796 A | 11/1999 | Miles |

| | | | | | | |
|---|---|---|---|---|---|---|
| 6,028,690 | A | 2/2000 | Carter et al. | 6,952,303 | B2 | 10/2005 | Lin et al. |
| 6,038,056 | A | 3/2000 | Florence et al. | 6,958,847 | B2 | 10/2005 | Lin |
| 6,040,937 | A | 3/2000 | Miles | 7,123,216 | B1 | 10/2006 | Miles |
| 6,049,317 | A | 4/2000 | Thompson et al. | 7,187,489 | B2 | 3/2007 | Miles |
| 6,055,090 | A | 4/2000 | Miles | 2001/0003487 | A1 | 6/2001 | Miles |
| 6,061,075 | A | 5/2000 | Nelson et al. | 2002/0015215 | A1 | 2/2002 | Miles |
| 6,088,474 | A * | 7/2000 | Dudasko et al. ............. 382/145 | 2002/0054424 | A1 | 5/2002 | Miles |
| 6,099,132 | A | 8/2000 | Kaeriyama | 2002/0075555 | A1 | 6/2002 | Miles |
| 6,113,239 | A | 9/2000 | Sampsell et al. | 2002/0126364 | A1 | 9/2002 | Miles |
| 6,147,790 | A | 11/2000 | Meier et al. | 2002/0157033 | A1 | 10/2002 | Cox |
| 6,160,833 | A | 12/2000 | Floyd et al. | 2003/0016361 | A1 | 1/2003 | Geradus et al. |
| 6,180,428 | B1 | 1/2001 | Peeters et al. | 2003/0043157 | A1 | 3/2003 | Miles |
| 6,201,633 | B1 | 3/2001 | Peeters et al. | 2003/0063081 | A1 | 4/2003 | Mutsumi et al. |
| 6,232,936 | B1 | 5/2001 | Gove et al. | 2003/0072070 | A1 | 4/2003 | Miles |
| 6,282,010 | B1 | 8/2001 | Sulzbach et al. | 2003/0077881 | A1 | 4/2003 | Ilaria et al. |
| 6,285,207 | B1 | 9/2001 | Listwan | 2003/0112231 | A1 | 6/2003 | Takashi |
| 6,295,154 | B1 | 9/2001 | Laor et al. | 2003/0202264 | A1 | 10/2003 | Weber et al. |
| 6,323,982 | B1 | 11/2001 | Hornbeck | 2003/0202265 | A1 | 10/2003 | Reboa et al. |
| 6,347,009 | B1 | 2/2002 | Takeuchi | 2003/0202266 | A1 | 10/2003 | Ring et al. |
| 6,407,560 | B1 | 6/2002 | Walraven et al. | 2004/0004610 | A1 | 1/2004 | Takashi et al. |
| RE37,847 | E | 9/2002 | Henley et al. | 2004/0027636 | A1 | 2/2004 | Miles |
| 6,447,126 | B1 | 9/2002 | Hornbeck | 2004/0051929 | A1 | 3/2004 | Sampsell et al. |
| 6,465,355 | B1 | 10/2002 | Horsley | 2004/0057043 | A1 | 3/2004 | Newman et al. |
| 6,466,358 | B2 | 10/2002 | Tew | 2004/0058532 | A1 | 3/2004 | Miles et al. |
| 6,473,274 | B1 | 10/2002 | Maimone et al. | 2004/0070400 | A1 | 4/2004 | van Spengen |
| 6,480,177 | B2 | 11/2002 | Doherty et al. | 2004/0080807 | A1 | 4/2004 | Chen et al. |
| 6,496,122 | B2 | 12/2002 | Sampsell | 2004/0125281 | A1 | 7/2004 | Lin et al. |
| 6,545,335 | B1 | 4/2003 | Chua et al. | 2004/0145049 | A1 | 7/2004 | McKinnell et al. |
| 6,548,908 | B2 | 4/2003 | Chua et al. | 2004/0145811 | A1 | 7/2004 | Lin et al. |
| 6,549,338 | B1 | 4/2003 | Wolverton et al. | 2004/0147056 | A1 | 7/2004 | McKinnell et al. |
| 6,552,840 | B2 | 4/2003 | Knipe | 2004/0147198 | A1 | 7/2004 | Lin et al. |
| 6,567,715 | B1 | 5/2003 | Sinclair et al. | 2004/0160143 | A1 | 8/2004 | Shreeve et al. |
| 6,574,033 | B1 | 6/2003 | Chui et al. | 2004/0174583 | A1 | 9/2004 | Chen et al. |
| 6,589,625 | B1 | 7/2003 | Kothari et al. | 2004/0175577 | A1 | 9/2004 | Lin et al. |
| 6,600,201 | B2 | 7/2003 | Hartwell et al. | 2004/0179281 | A1 | 9/2004 | Reboa |
| 6,606,175 | B1 | 8/2003 | Sampsell et al. | 2004/0206953 | A1 | 10/2004 | Morena et al. |
| 6,625,047 | B2 | 9/2003 | Coleman, Jr. | 2004/0207897 | A1 | 10/2004 | Lin |
| 6,630,786 | B2 | 10/2003 | Cummings et al. | 2004/0209192 | A1 | 10/2004 | Lin et al. |
| 6,632,698 | B2 | 10/2003 | Ives | 2004/0209195 | A1 | 10/2004 | Lin |
| 6,643,069 | B2 | 11/2003 | Dewald | 2004/0212026 | A1 | 10/2004 | Van Brocklin et al. |
| 6,650,455 | B2 | 11/2003 | Miles | 2004/0217378 | A1 | 11/2004 | Martin et al. |
| 6,666,561 | B1 | 12/2003 | Blakley | 2004/0217919 | A1 | 11/2004 | Pichl et al. |
| 6,674,090 | B1 | 1/2004 | Chua et al. | 2004/0218251 | A1 | 11/2004 | Piehl et al. |
| 6,674,562 | B1 | 1/2004 | Miles | 2004/0218334 | A1 | 11/2004 | Martin et al. |
| 6,680,792 | B2 | 1/2004 | Miles | 2004/0218341 | A1 | 11/2004 | Martin et al. |
| 6,710,908 | B2 | 3/2004 | Miles et al. | 2004/0227493 | A1 | 11/2004 | Van Brocklin et al. |
| 6,741,377 | B2 | 5/2004 | Miles | 2004/0240032 | A1 | 12/2004 | Miles |
| 6,741,384 | B1 | 5/2004 | Martin et al. | 2004/0240138 | A1 | 12/2004 | Martin et al. |
| 6,741,503 | B1 | 5/2004 | Farris et al. | 2004/0245588 | A1 | 12/2004 | Nikkel et al. |
| 6,747,785 | B2 | 6/2004 | Chen et al. | 2004/0263944 | A1 | 12/2004 | Miles et al. |
| 6,747,800 | B1 | 6/2004 | Lin | 2005/0001828 | A1 | 1/2005 | Martin et al. |
| 6,750,152 | B1 | 6/2004 | Christenson et al. | 2005/0003667 | A1 | 1/2005 | Lin et al. |
| 6,753,528 | B1 | 6/2004 | Nikoonahad et al. | 2005/0024557 | A1 | 2/2005 | Lin |
| 6,775,174 | B2 | 8/2004 | Huffman et al. | 2005/0035699 | A1 | 2/2005 | Tsai |
| 6,778,155 | B2 | 8/2004 | Doherty et al. | 2005/0036095 | A1 | 2/2005 | Yeh et al. |
| 6,794,119 | B2 | 9/2004 | Miles | 2005/0036192 | A1 | 2/2005 | Lin et al. |
| 6,811,267 | B1 | 11/2004 | Allen et al. | 2005/0038950 | A1 | 2/2005 | Andelmann |
| 6,819,469 | B1 | 11/2004 | Koba | 2005/0042117 | A1 | 2/2005 | Lin |
| 6,822,628 | B2 | 11/2004 | Dunphy et al. | 2005/0046922 | A1 | 3/2005 | Lin et al. |
| 6,824,739 | B1 | 11/2004 | Arney et al. | 2005/0046948 | A1 | 3/2005 | Lin |
| 6,829,132 | B2 | 12/2004 | Martin et al. | 2005/0057442 | A1 | 3/2005 | Way |
| 6,853,129 | B1 | 2/2005 | Cummings et al. | 2005/0068583 | A1 | 3/2005 | Gutkowski et al. |
| 6,855,610 | B2 | 2/2005 | Tung et al. | 2005/0068605 | A1 | 3/2005 | Tsai |
| 6,859,218 | B1 | 2/2005 | Luman et al. | 2005/0068606 | A1 | 3/2005 | Tsai |
| 6,861,277 | B1 | 3/2005 | Monroe et al. | 2005/0069209 | A1 | 3/2005 | Damera-Venkata et al. |
| 6,862,022 | B2 | 3/2005 | Slupe | 2005/0078348 | A1 | 4/2005 | Lin |
| 6,862,029 | B1 | 3/2005 | D'Souza et al. | 2005/0168849 | A1 | 8/2005 | Lin |
| 6,867,896 | B2 | 3/2005 | Miles | 2005/0195462 | A1 | 9/2005 | Lin |
| 6,870,581 | B2 | 3/2005 | Li et al. | 2005/0202649 | A1 | 9/2005 | Hung et al. |
| 6,870,654 | B2 | 3/2005 | Lin et al. | 2005/0249966 | A1 | 11/2005 | Tung et al. |
| 6,882,458 | B2 | 4/2005 | Lin et al. | 2006/0066935 | A1 | 3/2006 | Cummings et al. |
| 6,882,461 | B1 | 4/2005 | Tsai et al. | | | | |
| 6,912,022 | B2 | 6/2005 | Lin et al. | | | | |

2007/0097134 A1 5/2007 Miles

FOREIGN PATENT DOCUMENTS

| CH | 6855887 | 10/1995 |
|---|---|---|
| DE | 19525081 | 1/1997 |
| EP | 1065645 | 1/2001 |
| FR | 2516785 | 5/1983 |
| GB | 2030721 | 4/1980 |
| JP | 01259243 | 1/1990 |
| JP | 3002540 A | 1/1991 |
| JP | 11 337412 | 3/2000 |
| WO | WO 95/30924 | 11/1995 |
| WO | WO 97/17628 | 5/1997 |
| WO | WO 99/52006 A2 | 10/1999 |
| WO | WO 99/52006 A3 | 10/1999 |
| WO | WO 01/69310 A1 | 9/2001 |
| WO | WO 02/093116 A1 | 11/2002 |
| WO | WO 03/007049 A1 | 1/2003 |
| WO | WO 03/069413 A1 | 8/2003 |
| WO | WO 03/073151 A1 | 9/2003 |
| WO | WO 2004/006003 A1 | 1/2004 |
| WO | WO 2004/025239 A2 | 3/2004 |
| WO | WO 2004/026757 A2 | 4/2004 |
| WO | WO 2005/001410 A1 | 1/2005 |

OTHER PUBLICATIONS

Aratani et al., "Process and Design Considerations for Surface Micromachined Beams for a Tuneable Interferometer Array in Silicon" Proc. IEEE Microelectromechanical Workshop, Fort Lauderdale, FL, pp. 230-235 (Feb. 1993).
Aratani et al., "Surface Micromachined Tuneable Interferometer Array," Sensors and Actuators, pp. 17-23 (1994).
Conner, "Hybrid Color Display Using Optical Interference Filter Array," SID Digest, pp. 255-580 (1993).
Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).
Goossen et al., "Possible Display Applications of the Silicon Mechanical Anti-Reflection Switch," Society for Information Display 91994).
Goossen et al., "Silicon Modulator Based on Mechanically-Active Anti-Reflection Layer with 1Mbit/sec Capability for Fiber-in-the-Loop Applications," IEEE Photonics Technology Letters (Sep. 1994).
Gosch, "West Germany Grabs the Lead in X-Ray Lithography," Electronics, pp. 78-80 (Feb. 5, 1987).
Harpster Timothy J et al., "A Passive Humidity Monitoring System for In Situ Remote Wireless Testing of Micropackages," J Microelectromech Syst. vol. 11, No. 1, p. 61-67, (2002).
Howard et al., "Nanometer-Scale Fabrication Techniques," VLSI Electronics: Microstructure Science, vol. 5, pp. 145-153 and pp. 166-173 (1982).
Jerman et al., "A Miniature Fabry-Perot Interferometer with a Corrugated Silicon Diaphragm Support," IEEE Electron Devices Society (1988).
Johnson "Optical Scanners," Microwave Scanning Antennas, vol. 1, pp. 251-261 (1964).
Light over Matter, Circle No. 36 (Jun. 1993).
Miles, "Interferometric Modulation:MOEMS as an Enabling Technology for High-Perfomorance Reflective Displays," Proceedings of the SPIE, vol. 4985, p. 131-139. (2003).
Miles et al., "Digital Paper™ for Reflective Displays," J. of the Society for Information Display Soc. Inf. Display USA. vol. 11, No. 1, p. 209-215 (2003).
Newsbreaks, "Quantum-trench devices might operate at terahertz frequencies," Laser Focus World (May 1993).
Oliner et al., "Radiating Elements and Mutual Coupling," Microwave Scanning Antennas, vol. 2, p. 131-194 (1966).
Raley et al., "A Fabry-Perot Microinterferometer for Visible Wavelengths," IEEE Solid-State Sensor and Actuator Workshop, Hilton Head, SC (1992).
"Reflection/backscattering Probes," Ocean Optics, INC, Internet Article, p. 1-3. XP-002358482. URL:http://web.archive.org/web/20040619022333/www.oceanoptics.com/products/reflectionprobes.asp> retrieved on Jun. 19, 2004.
Roveti, "Choosing a Humidity Sensor: A Review of Three Technologies", http://www.sensorsmag.com/articles/0701/54/main.shtml, (published prior to Sep. 17, 2004).
Skaggs et al, "Automatic Testing of the Digital Micromirror Device", IEEE/LEOS 1996 Summer Topical Meetings, pp. 11-12, (Aug. 5-9, 1996).
Sperger et al., "High Performance Patterned All-Dielectric Interference Colour Filter for Display Applications," SID Digest, pp. 81-83 (1994).
Stone,d "Radiation and Optics, An Introduction to the Classical Theory," McGraw-Hill, pp. 340-343 (1963).
Tabata et al., "In Situ Observation and Analysis of Wet Etching Process for Micro Electro-mechanical systems," Proc. Of the Workshop on Micro Electro Mechanical Systems. Vol. Workshop 4. p. 99-102, (1991).
Walker, et al., "Electron-beam-tunable Interference Filter Spatial Light Modulator," Optics Letters vol. 13, No. 5, pp. 345-347 (May 1988).
Waelti M. et al., "Package Quality Testing Using Integrated Pressure Sensor," Proc. Of the SPIE, vol. 3582, p. 981-986, (1998).
Winton, John M., "A novel way to capture solar energy," Chemical Week, pp. 17-18 (May 15, 1985).
Wu, "Design of a Reflective Color LCD Using Optical Interference Reflectors," ASIA Display '95, pp. 929-931 (Oct. 16, 1995).
Drieenhuizen, et al., "Comparison of Techniques for measuring Both Compressive and Tensile Stress in Thin Films." *Sensors and Actuators*, vol. 37-38, pp. 759-765. (1993).
Guckel et al., "Fine-Grained Polysilicon Films with Built-In Tensile Strain," *IEEE Transactions on Electron Devices*, vol. 35, No. 6, pp. 801-802, (1988).
"High-reflectivity Specular Reflectance standard," [Online] XP002374849, (URL:http://web.archive.org/web/20040220134330/www.oceanoptics.com/products/stan.ss1.asp> (retrieved on Feb. 20, 2004).
Lin et al., "A Micro Strain Gauge with Mechanical Amplifier," *J. of Microelectromechanical Systems*, vol. 6, No. 4, (1997).
"Low-reflectivity Specular Reflectance Standard," Internet Article, XP002374848 <URL:http://web.archive.org/web/20040220134257/www.oceanoptics.com/Productsstan.ss1.asp> (retrieved on Feb. 20, 2004).
Pruessner et al., "Mechanical Property Measurement on InP-based MEMS for optical communications," *Sensors and Actuators*, vol. 105, pp. 190-200, (2003).
"S2000 Miniature Fiber Optic Spectrometer", Internet Article, XP002358483, pp. 1-2, <URL:http://web.archive.org/web/20040617035842/www.oceanoptics..com/products/s2000.asp> (Retrieved Jun. 17, 2004).
Singh et al., "Strain Studies in LPCVD Polysilicon for Surface Micromachined Devices," *Sensors and Actuators*, vol. 77, pp. 133-138, (1999).
Srikar et al., "A Critical Review of Microscale Mechanical Testing Methods Used in the Design of Microelectromechanical Systems," *Society for Experimental mechanics*, vol. 43, No. 3, (2003).
Zhang, et al., "Measurements of Residual Stresses in Thin Films Using Micro-Rotating-Structures." *Thin Solid Films*, vol. 335, pp. 97-105, (1998).
Dokmeci, et al. *A High-Sensitivity Polyimide Capacitive Relative Humidity Sensor for Monitoring Anodically Bonded Hermetic Micropackages* Journal of Microelectromechanical Systems, vol. 10, No. 2, Jun. 2001, 197-204.
Jin, et al. "MEMS Vacuum Packaging Technology and Applications" Electronics Packaging Technology, 2003, 5th Conference, Dec. 10-12, 2003, Piscataway, NJ, pp. 301-306.
Tominette, et al, Moisture and Impurities Detection and removal in Packaged MEMS, proceeding of SPIE vol. 4558, (2001), pp. 215-225.
IPRP for PCT/US05/034307 filed Sep. 23, 2005.
Jackson, "Classical Electrodynamics," John Wiley & Sons Inc., pp. 568-573 (1962).
Miles, A New Reflective FPD Technology Using Interferometric Modulation, Journal of the SID, May 4, 1997, pp. 379-382.

\* cited by examiner

| | Column Output Signals | |
|---|---|---|
| | $+V_{bias}$ | $-V_{bias}$ |
| Row Output Signals  0 | Stable | Stable |
| $+\Delta V$ | Relax | Actuate |
| $-\Delta V$ | Actuate | Relax |

MEASUREMENT OF THE DYNAMIC CHARACTERISTICS OF INTERFEROMETRIC MODULATORS

CROSS REFERENCE TO RELATED APPLICATIONS

This application claims priority to U.S. Provisional Application No. 60/613,537 titled "Measurement of the Dynamic Characteristics of Interferometric Modulators," filed Sep. 27, 2004, which is incorporated by reference in its entirety and assigned to the assignee of the present invention.

BACKGROUND

1. Field of the Invention

The field of the invention relates to microelectromechanical systems (MEMS).

2. Description of the Related Technology

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. It would be beneficial to be able to measure parameters of the interferometric modulators indicative of their performance to determine whether they are adequate for a particular application. Testing the performance of the MEMS interferometric modulator before it is incorporated in a display product is useful for discovering fabrication problems and identifying defective modulators early in the manufacturing process of the display product.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In another embodiment, a method of testing a plurality of interferometric modulators includes applying a voltage waveform to the interferometric modulators to vary the interferometric modulators between an actuated and a non-actuated state, or an non-actuated state and an actuated state, detecting light related from the interferometric modulators, and determining one or more response time parameters of the interferometric modulators based on said detecting.

In another embodiment, a system for testing a plurality of interferometric modulators, comprises, an illumination source adapted to provide incident light to a plurality of interferometric modulators, a voltage source adapted to apply a voltage waveform to the interferometric modulators to vary the interferometric modulators between an actuated and a non-actuated state, or an non-actuated state and an actuated state, an optical detector adapted to detect light reflected from the plurality of interferometric modulators and produce a signal corresponding to the detected light, and a computer configured to receive the signal from the optical detector and determine one or more response time parameters of the interferometric modulators based on the signal.

In another embodiment, a system for testing a plurality of interferometric modulators, comprises means for providing light to the plurality of interferometric modulators, means for applying a voltage waveform to the interferometric modulators to vary the interferometric modulators between an actuated and a non-actuated state, or an non-actuated state and an actuated state, means for detecting light reflected from the plurality of interferometric modulators, means for producing a signal corresponding to the detected light, and means for determining one or more response time parameters of the interferometric modulators based on the signal.

In another embodiment, a method of testing a plurality of interferometric modulators comprises applying a voltage waveform to the interferometric modulators to vary the interferometric modulators between an actuated and a non-actuated state, or an non-actuated state and an actuated state, detecting reflectivity of light from the interferometric modulators, and determining one or more response time parameters of the interferometric modulators based on said detecting reflectivity of light, wherein said determining step determines an actuation time of at least a portion of the interferometric modulators during application of the positive switching voltage level.

In another embodiment, a system of testing a plurality of interferometric modulators comprises a voltage source configured to apply a voltage waveform to the interferometric modulators to vary the interferometric modulators between an actuated and a non-actuated state, or an non-actuated state and an actuated state, a light source positioned to illuminate the interferometric modulators, a detector disposed to receive light from the interferometric modulators and produce a corresponding signal, and a computer configured to receive the signal from the detector and determine, based on the signal, one or more response time parameters of the interferometric modulators during application of an actuation voltage or a release voltage.

In another embodiment, a system for testing a plurality of interferometric modulators comprises means for applying a voltage waveform to the interferometric modulators to vary the interferometric modulators between an actuated and a non-actuated state, or an non-actuated state and an actuated state, means for illuminating the interferometric modulators, means for sensing light reflected from the interferometric modulators and producing a corresponding signal, and means for determining, based on the signal, one or more response time parameters of the interferometric modulators during application of an actuation voltage or a release voltage.

In another embodiment, a method of testing a plurality of interferometric modulators comprises setting a time period during which to apply a switching voltage level, said switching voltage level being sufficient to change the interferometric modulators between a non-actuated state and an actuated state, or an actuated state and a non-actuated state, applying a voltage waveform comprising the switching voltage level for the time period, detecting light reflecting from the interferometric modulators, determining one or more response time parameters of the interferometric modulators based on said detecting, and repeating said setting, applying, detecting, and determining step to identify a minimum time period where a sufficient number of pixels have actuated or released, wherein said subsequent setting of the time period is done based on one or more determined response time parameters.

In another embodiment, a system for testing a plurality of interferometric modulators comprises a computer configured to determine a time period during which to apply a switching voltage level, said switching voltage level being sufficient to change the interferometric modulators between a non-actuated state and an actuated state, or an actuated state and a non-actuated state, a voltage source controlled by said computer, said voltage source configured to apply a voltage waveform comprising the switching voltage level for the time period, a light source positioned to illuminate the interferometric modulators, and a detector positioned to receive light reflecting from the interferometric modulators and produce a signal corresponding to the received light, wherein said computer receives the signal from the detector and determines one or more response time parameters based on the signal, and said computer is further configured to iteratively control the application of a voltage waveform for a determined time period to identify a minimum time period where the number of pixels have actuated or released during the determined time period meets a threshold value.

In another embodiment, a system for testing a plurality of interferometric modulators comprises means for determining a time period during which to apply a switching voltage level, said switching voltage level being sufficient to change the interferometric modulators between a non-actuated state and an actuated state, or an actuated state and a non-actuated state; means for applying a controlled by said computer, said voltage source configured to apply a voltage waveform comprising the switching voltage level for the time period, means for illuminating the interferometric modulators; and means for sensing light reflected from the interferometric modulators and produce a signal corresponding to the received light, wherein said determining a time period means receives the signal from the sensing means and determines one or more response time parameters based on the signal, and said determining a time period means is further configured to iteratively control the application of a voltage waveform for a determined time period to identify a minimum time period where the number of pixels have actuated or released during the determined time period meets a threshold value.

DETAILED DESCRIPTION OF CERTAIN EMBODIMENTS

Figure 1:
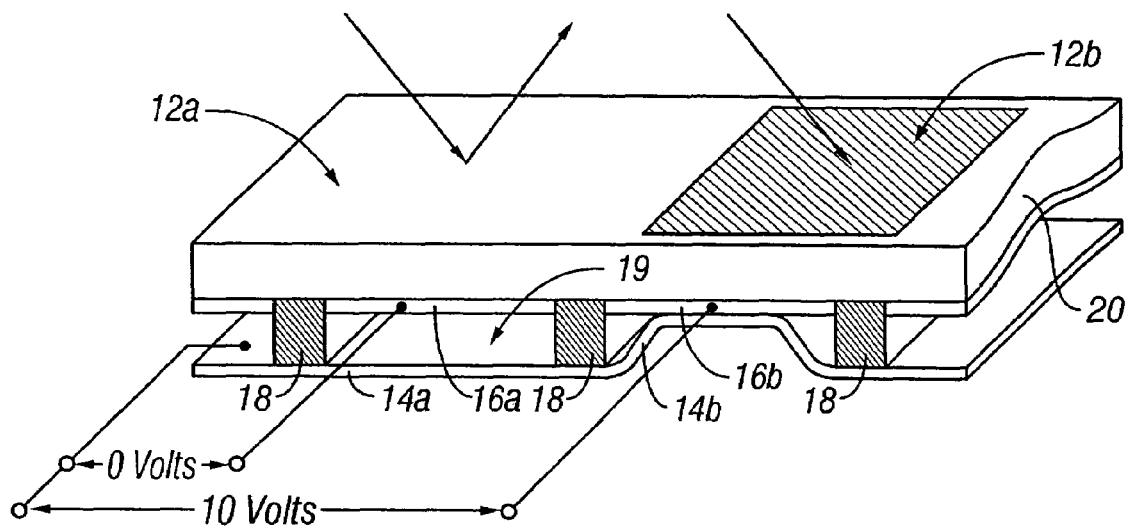
FIG. 1 is an isometric view schematically depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments of the invention. However, the invention can be embodied in a multitude of different ways. In this description, reference is made to the drawings wherein like parts are designated with like numerals throughout.

As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Testing the performance of interferometric modulators before incorporating them in a display product is useful for discovering fabrication problems and identifying defective modulators early in the manufacturing process of the display product. In some embodiments, the operation of an array of interferometric modulators is tested to ensure it meets response time appropriate criteria for its intended use. Generally, the response time is the length of time it takes the interferometric modulators to change from an actuated state to a released state, or vice-versa, in response to an appropriate applied voltage signal.

In some embodiments, the operation of the array of interferometric modulators is tested by detecting the light reflected from the array while setting the interferometric modulators to an actuated or released state. By first determining threshold values that associate the amount of reflected light with the number of interferometric modulators that have actuated or released, a response time of the array of interferometric modulators can be determined by applying a driving voltage that causes the array of interferometric modulators to change state, and determining how long it takes for the predetermined number of interferometric modulators to change state, based on the light reflected from the array. The reflected light is detected either visually by an operator or automatically (e.g., by a computerized inspection system). Measuring the actuation and release response time is especially important when the interferometric modulators are going to be used in a device that requires relatively fast refresh rates, for example, displaying image data at a video data rate. In typical applications for testing response times for multiple interferometric modulators the measured response time reflects the slowest response of the variables that affect response time.

One way to measure a response time is to first apply an offset voltage to the interferometric modulators to ensure they are in a released state, and then an actuation voltage is applied. In another test, an offset voltage is first applied to release the interferometric modulators, then a bias voltage is applied, and finally an actuation voltage is applied, thus testing a response time in the manner the interferometric modulators and typically operated (e.g., within a hysteresis window). For both of the tests, the actuation voltage is applied for a relatively long period of time compared to the response time. Alternatively, the length of time that an actuation (or release) voltage is applied can be varied to determine the minimum amount of time required to actuate (or release) a predetermined number of interferometric modulators.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12$a$ and 12$b$. In the interferometric modulator 12$a$ on the left, a movable reflective layer 14$a$ is illustrated in a relaxed position at a predetermined distance from an optical stack 16$a$, which includes a partially reflective layer. In the interferometric modulator 12$b$ on the right, the movable highly reflective layer 14$b$ is illustrated in an actuated position adjacent to the optical stack 16$b$.

The optical stacks 16$a$ and 16$b$ (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto an optically transmissive (e.g. transparent) substrate 20. In some embodiments, the layers are patterned into parallel strips, and may form row electrodes in a display device as described further below. The movable reflective layers 14$a$, 14$b$ may be formed as a series of parallel strips of a deposited metal layer or layers (orthogonal to the row electrodes of 16$a$, 16$b$) deposited on top of posts 18 and an intervening sacrificial material deposited between the posts 18. When the sacrificial material is etched away, the movable reflective layers 14$a$, 14$b$ are separated from the optical stacks 16$a$, 16$b$ by a defined gap 19. A highly conductive and reflective material such as aluminum may be used for the reflective layers 14, and these strips may form column electrodes in a display device.

With no applied voltage, the cavity 19 remains between the movable reflective layer 14$a$ and optical stack 16$a$, with the movable reflective layer 14$a$ in a mechanically relaxed state, as illustrated by the pixel 12$a$ in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in FIG. 1) within the optical stack 16 may prevent shorting and control the separation distance between layers 14 and 16, as illustrated by pixel 12$b$ on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2-5 illustrate one exemplary process and system for using an array of interferometric modulators in a display application.

Figure 2:
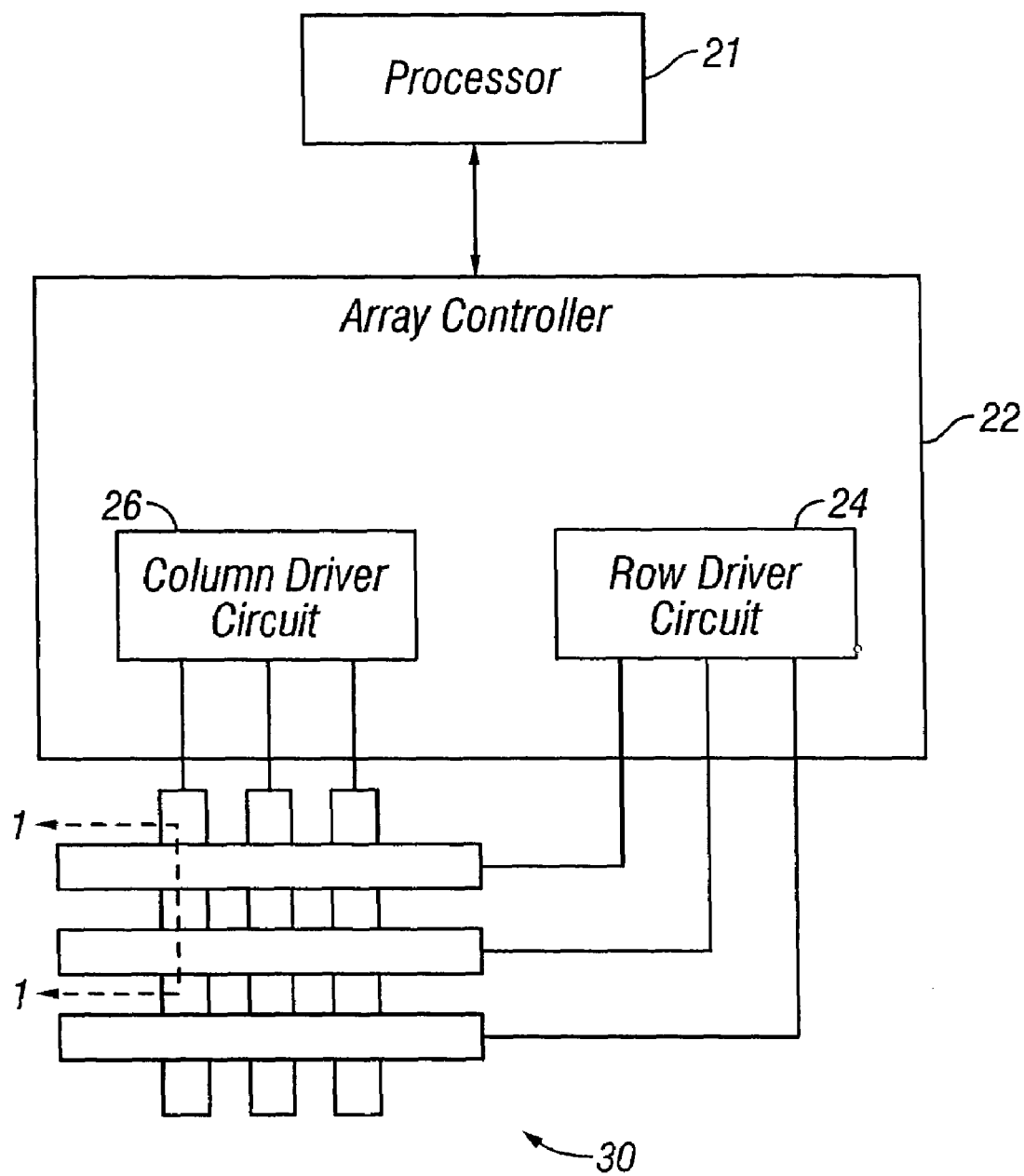
FIG. 2 is a system block diagram schematically illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
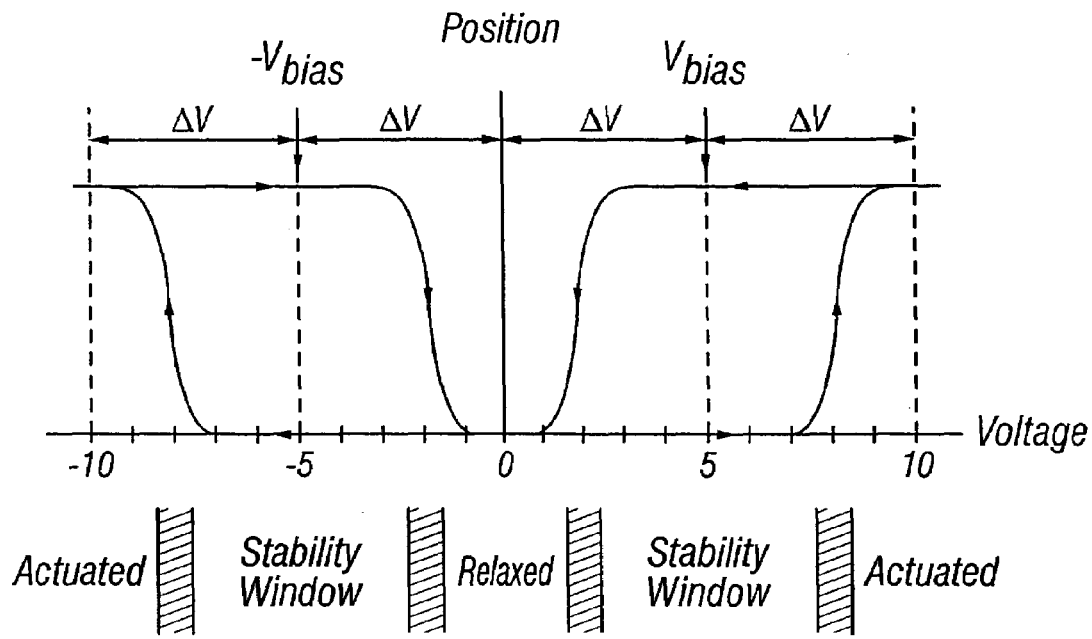
FIG. 3 is a schematic diagram of movable mirror position versus applied voltage for one exemplary embodiment of an interferometric modulator of FIG. 1.
FIG. 4 is a schematic illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
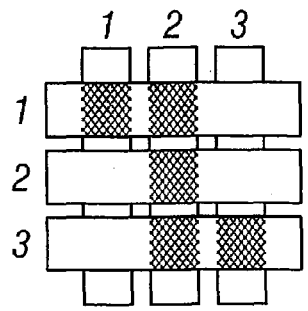
FIGS. 5A and 5B schematically illustrate one exemplary timing diagram for row and column signals that may be used to write a frame of display data to the 3×3 interferometric modulator display of FIG. 2.
Figure 5B:
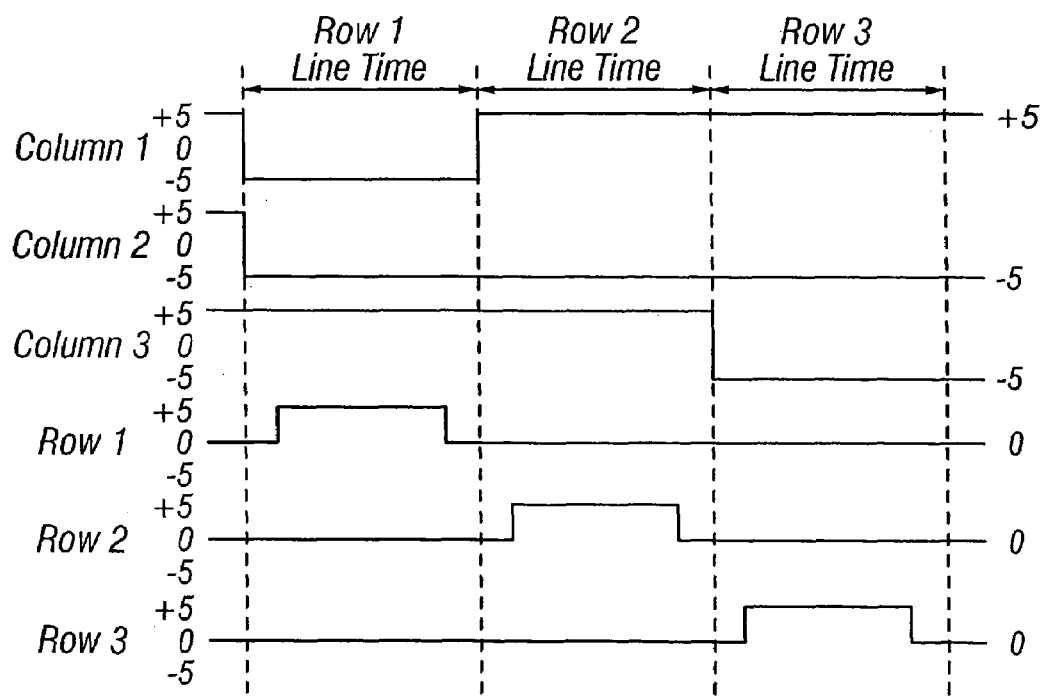

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
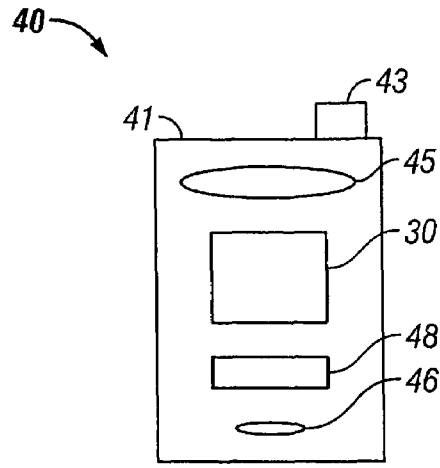
FIGS. 6A and 6B are system block diagrams schematically illustrating an embodiment of a visual display device comprising a plurality of interferometric modulators.
Figure 6B:
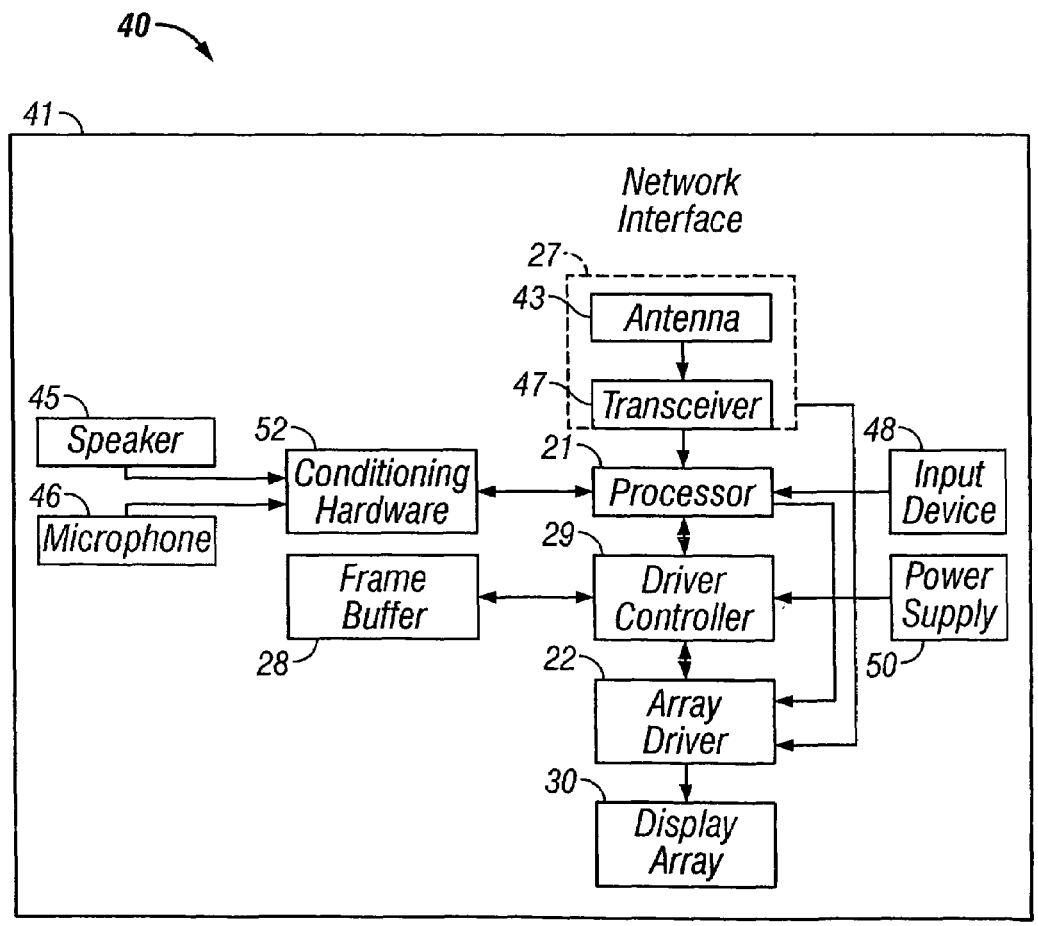

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
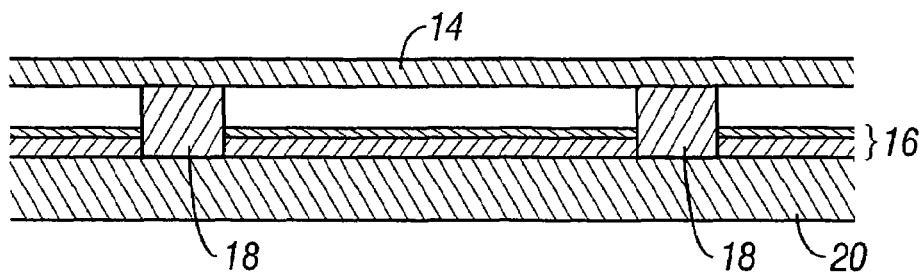
FIG. 7A is a schematic cross section of the device of FIG. 1.
Figure 7B:
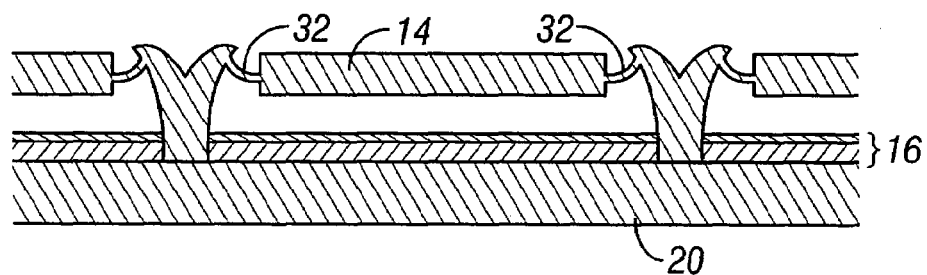
FIG. 7B is a schematic cross section of an alternative embodiment of an interferometric modulator.
Figure 7C:
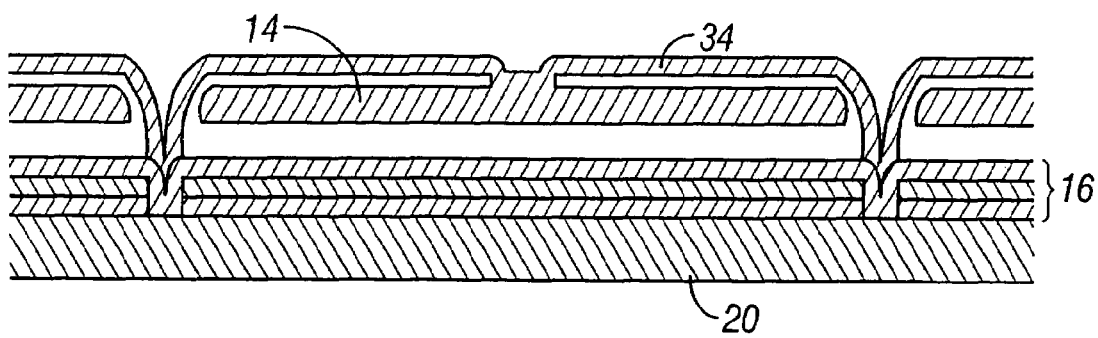
FIG. 7C is a schematic cross section of another alternative embodiment of an interferometric modulator.
Figure 7D:
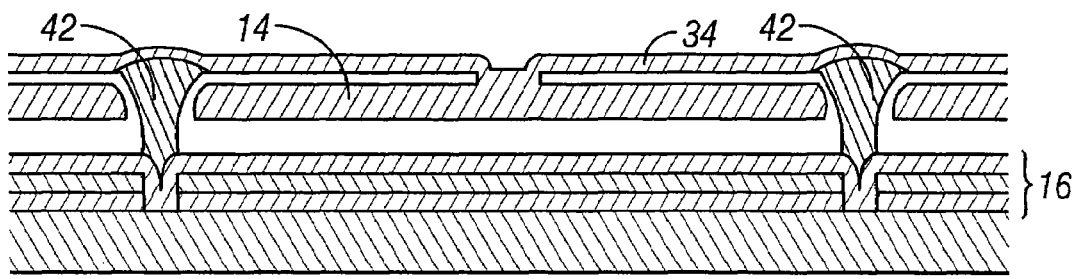
FIG. 7D is a schematic cross section of yet another alternative embodiment of an interferometric modulator.
Figure 7E:
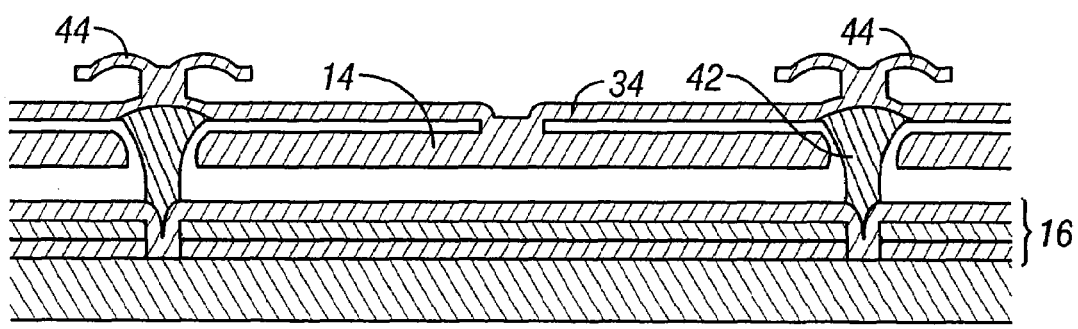
FIG. 7E is a schematic cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the optically transmissive substrate 20, the side opposite to that upon which the modulator is arranged. In these embodiments, the reflective layer 14 optically shields the portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

The fabrication of a MEMS interferometric modulator may use conventional semiconductor manufacturing techniques such as photolithography, deposition (e.g., "dry" methods such as chemical vapor deposition (CVD) and wet methods such as spin coating), masking, and etching (e.g., dry methods such as plasma etch and wet methods), etc. Testing the performance of the MEMS interferometric modulator before it is incorporated in a display product is useful for discovering fabrication problems and identifying defective modulators early in the manufacturing process of the display product.

Figure 8:
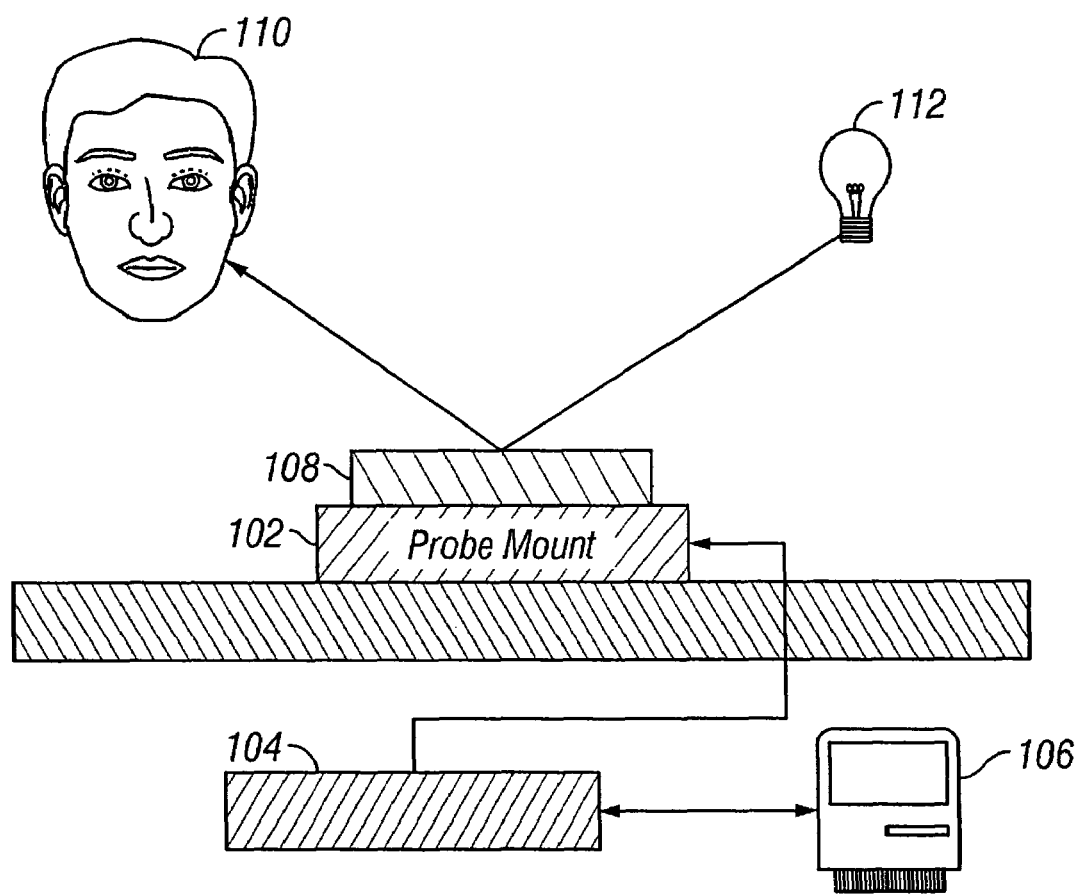
FIG. 8 is a schematic illustrating a system for visually observing reflectance of MEMS interferometric modulators.

In some embodiments, the operation of an array of interferometric modulators is tested by detecting the light reflected from the array while setting the interferometric modulators to an actuated or released state in a predetermined process, for example, those processes which are described further herein. Such testing can be done to determine desired quality checks, including to test the uniformity of the array in a released or actuated state, or to determine the actuation and/or release response times. Depending on the testing methodology, the reflected light can be detected with either visually (e.g., by an operator) or automatically (e.g., by a computerized inspection system). For example, FIG. 8 illustrates an embodiment of a system to inspect an array for defect detection by visually inspecting the light reflected from an illuminated array while the array is being driven to various known states. A MEMS interferometric modulator array is placed in a probe mount 102. The probe mount 102 is interfaced with a switch box 104 and/or control computer 106 to control the driven states of the array using drive schemes that are described hereinbelow. In some embodiments, a diffuser plate 108 may be placed over the array so that the viewer 110 observes a non-specular display. A continuous spectrum light source 112 can be provided to assist visual observation of the reflected light. In some embodiments, multiple displays may be viewed by the viewer 110 simultaneously to increase throughput. The systems and processes disclosed herein for testing an array can also be used to test single or multiple interferometric modulators that are not configured in an array.

In some embodiments, the testing process may be automated. Thus, for example, detection of reflectivity as a function of applied voltage stimulus may be automatically performed at pre-determined areas on an interferometric modulator array. The calculation of parameters and quality control determinations may be automatically performed using suitable algorithms executed on a computing device. Furthermore, positioning of interferometric modulator arrays within a testing apparatus may be automated so that high throughput of mass-manufactured interferometric modulator displays may be accomplished. In some embodiments, a selected percentage sample of mass-manufactured displays are tested for quality control purposes.

Figure 9:
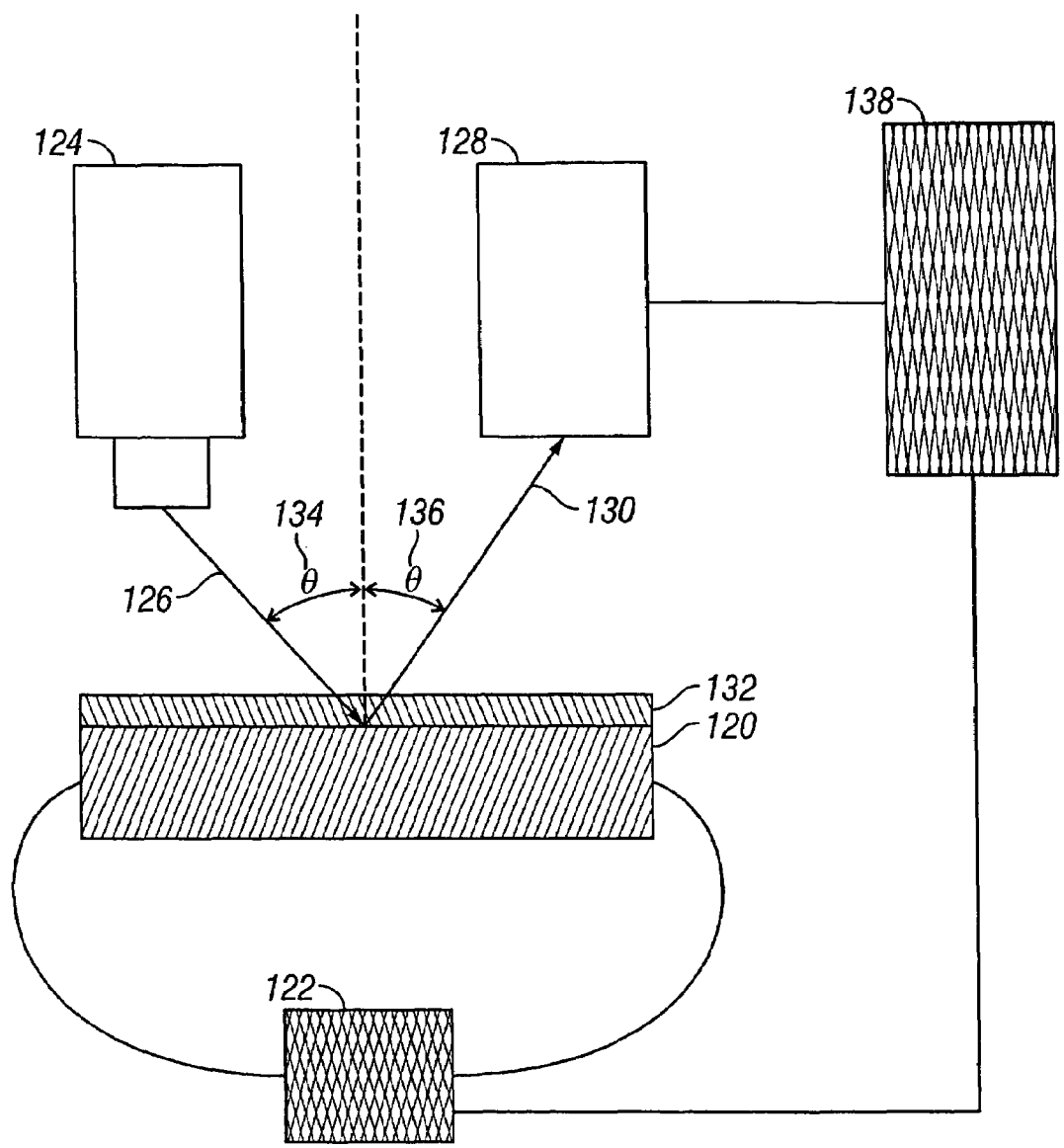
FIG. 9 is a schematic illustrating a system for automatically determining reflectance of MEMS interferometric modulators.

One embodiment of an apparatus suitable for measuring the reflectivity of an array of interferometric modulators using an automated detection system is depicted in FIG. 9. An array 120 that includes a plurality of interferometric modulators, for example, similar to the interferometric modulator illustrated in FIG. 1, is electrically connected to a voltage driving source 122. The voltage driving source 122 applies the time-varying voltage stimulus, such as a square voltage waveform, to the array 120. The voltage signal may be applied to all interferometric modulators in the array 120 simultaneously. Alternatively, a voltage signal may be applied to only those interferometric modulators from which reflectivity are being measured. A light source 124 illuminates the array 120. In one embodiment, a standard D65 light source is used for the light source 124. Light source 124 provides light 126 to the interferometric modulator array 120, which is then reflected upward.

A photo detector 128 may be used to detect the intensity of the reflected light 130 from the interferometric modulator array 120. A diffuser film 132 may be optionally placed over the interferometric modulator array 120. The diffuser film 132 scatters the light 130 reflected from the interferometric modulator array 120. Such scattering allows the light source 124 and detector 128 to be placed at angles 134 and 136 relative to the array 120. While the incident light reflected from the array 120 may be at a maximum if angles 134 and 136 are complementary, the use of a diffuser film 132 allows for detection at an angle differing from the angle of greatest specular reflection. If a diffuser film 132 is not used, then it can be advantageous that incident light 126 fall incident on and reflect back from the array 120 at an angle close to perpendicular to the array 120. Such a configuration is desirable because interferometric modulators can have a narrow viewing angle causing the intensity of reflected light to fall rapidly at wider angles.

A computer 138 in communication with the detector 128 can be used to record reflectivity versus voltage characteristics (e.g., the hysteresis curve) and calculate electrical parameters. The computer 138 can be connected to the voltage driving source 122 to provide interferometric modulator response time information relative to the time when the driving voltage is applied to the array 120. In typical applications for testing response times for multiple interferometric modulators, for example, an array of interferometric modulators, the measured response time reflects the slowest response of the variables that affect response time.

Figure 10:
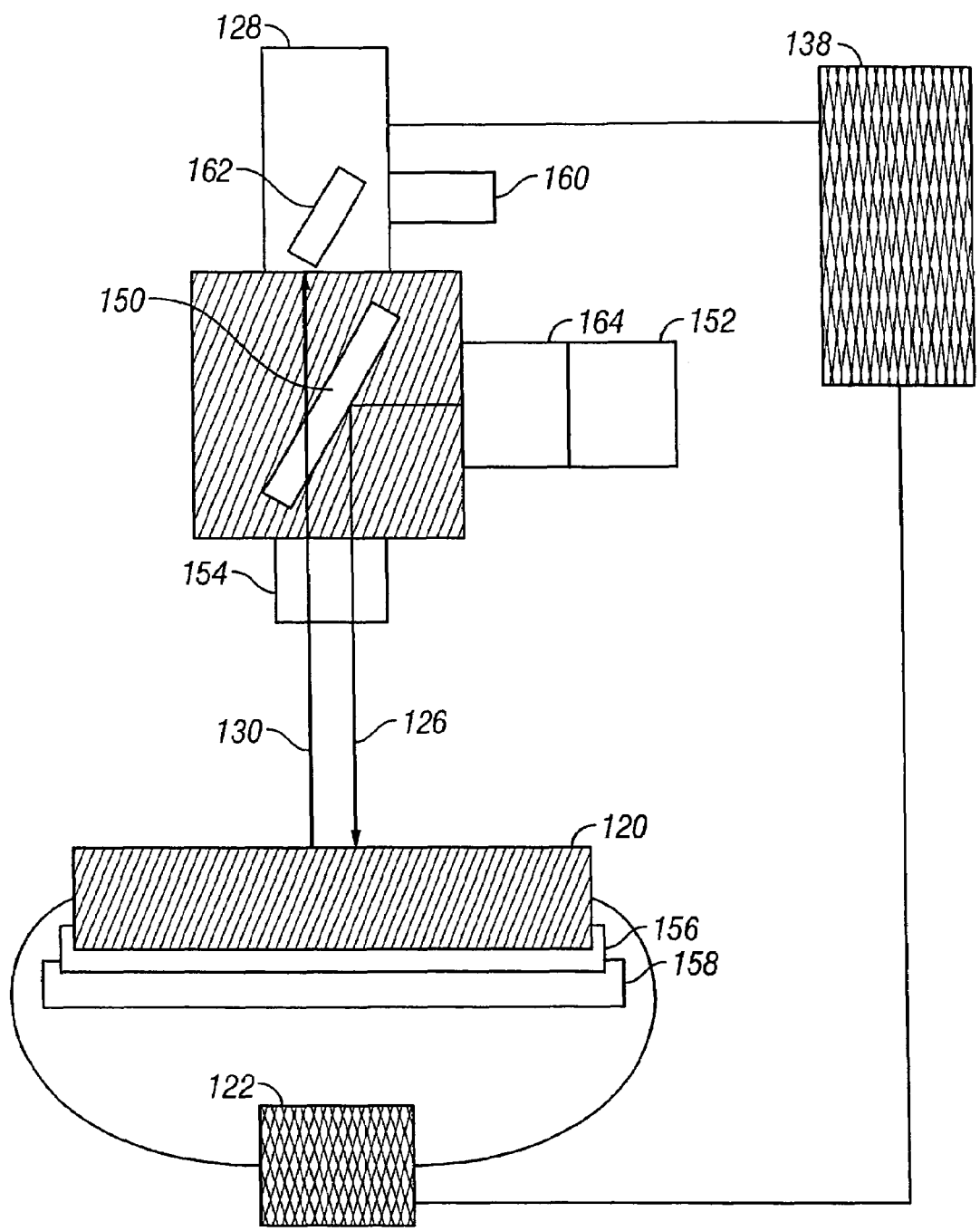
FIG. 10 is a schematic illustrating another embodiment of a system for automatically determining reflectance of MEMS interferometric modulators.

Because a MEMS interferometric modulator display is reflective and inherently specular in nature, it can be advantageous to detect a measure of reflectance of the array of incident light and reflected light that are both normal to the substrate surface (e.g., in-line lighting). In one embodiment, in-line lighting is accomplished using a system illustrated in FIG. 10. In this system, a beam splitter 150 is provided that reflects light from a light source 152 onto the array 120 being evaluated. The path of the light 126 reflected by the beam splitter 150 is normal to the array 120. The voltage driving source 122 applies a desired time-varying voltage stimulus to the array 120 while the light source 152 illuminates the array 120.

A detection module 128 is positioned to detect light 130 reflected from the array 120 and passing through the beamsplitter 150. In this way, both the incident light 126 and the reflected light 130 are normal to the array 120. In some embodiments, the system may additionally comprise a microscope objective 154 for evaluating only a small portion of the total active surface area. The array 120 may be placed in probe mount 156 which may then be secured to an X-Y stage 158 for moving the array 120 so that the desired portion of the active area is under the microscope objective 154 for evaluation. The detection module 128 may comprise one or more detectors such as a photo detector or spectrometer, and a CCD camera 160.

One or more beam splitters 162 may be used for simultaneous measurement by more than one detector. The light source 152 may be chosen to provide light having the desirable spectral and intensity characteristics. For example, it may be desirable to have the light source 152 approximate the characteristics of the light source that will typically be used to view a display the array 120 is intended to be incorporated in. In one embodiment, a standard D65 light source is used. In some embodiments, the light source 152 may be coupled to an illumination control device 164, preferably of the Koehler design. The aperture of the illumination control device 164 may be adjusted to illuminate only the area of interest on the array 120.

A computer 138 in communication with the detector 128 can be used to record reflectivity versus voltage characteristics (e.g., the hysteresis curve) and calculate parameters including response times of the interferometric modulators. The computer 138 can be connected to the voltage driving source 122 to provide interferometric modulator response time information relative to the time when the driving voltage is applied to the array 120. In some embodiments, the computer 138 can also be used to control the driving voltage source 122 during testing of interferometric modulators.

Other embodiments of systems are available for achieving in-line lighting and detection. For example, in some embodiments a bundle of fiber optics, some of which provide incident light and others which detect reflected light may be aligned over the desired area of array 120. One or more fibers in the bundle may be connected to a light source while one or more other fibers in the bundle are connected to detectors. In one embodiment, multiple outer fibers in the bundle are connected to a light source while one or more inner fibers in the bundle are connected to one or more detectors such as a spectrometer and/or a photodetector. In some embodiments, the end of the fiber bundle is positioned such that a beam splitter, such as beam splitter 150 in FIG. 10, directs incident and reflected light normal to the array 120. This configuration allows additional detectors in detection module 128, such as a CCD camera 160, to be used simultaneously. Alternatively, the fiber bundle may be positioned so that the end is already normal to the array 120.

Figure 11:
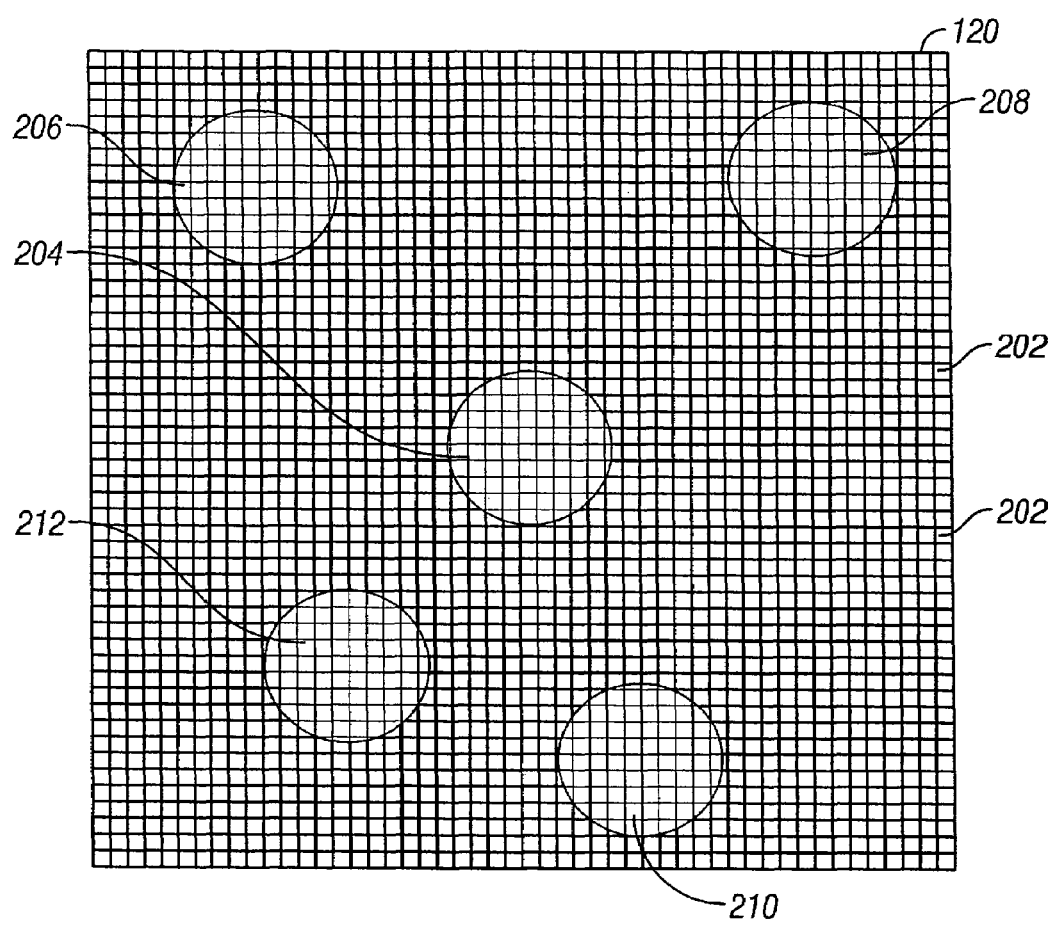
FIG. 11 is a schematic illustrating observing portions of an array of MEMS interferometric modulators.

FIG. 11 depicts an interferometric modulator array 120 containing a plurality of interferometric modulator elements 202. As discussed above, a microscopic lens 154 may be used to focus detection of reflectivity on a portion of the interferometric modulator array 120 while the array is driven using a desired voltage waveform, as discussed in reference to FIGS. 12-19. For example, area 204 may be the area that is detected during testing. The area 204 tested may be of any suitable size. In one embodiment, only a few interferometric modulator elements 202 are included. In one embodiment, an approximately 1 mm diameter spot is measured. In some embodiments, multiple areas, such as areas 204, 206, 208, 210, and 212 are measured sequentially on the same array 120. The number of areas and location of the areas may be selected based on the desired testing standard. For example, the suggested number of spot measurements and their locations recommended by ANSI or VESA for display testing may be used. In one embodiment, a single area 204 near the center of the array 120 is measured.

An optical system such as described above with reference to FIGS. 8-11 may be used to characterize the electro-optical characteristics of one or more pixels or regions of the array while it is driven to actuate and/or release. In one embodiment, the uniformity of bright and dark states when the interferometric modulators are driven by a memory waveform is measured. The entire array can be driven by a gang drive such that all interferometric modulators are driven together (e.g., all rows are shorted and grounded while all columns are shorted and driven). A region of the interferometric modulators array may be examined using, for example, the system described in FIG. 10 having a detector 128 and an analysis computer 138. In some embodiments, a viewer can asses the uniformity of bright and dark states by visually observing CCD images. Alternatively, analysis of the CCD images may be automated using a computer algorithm.

Figure 12:
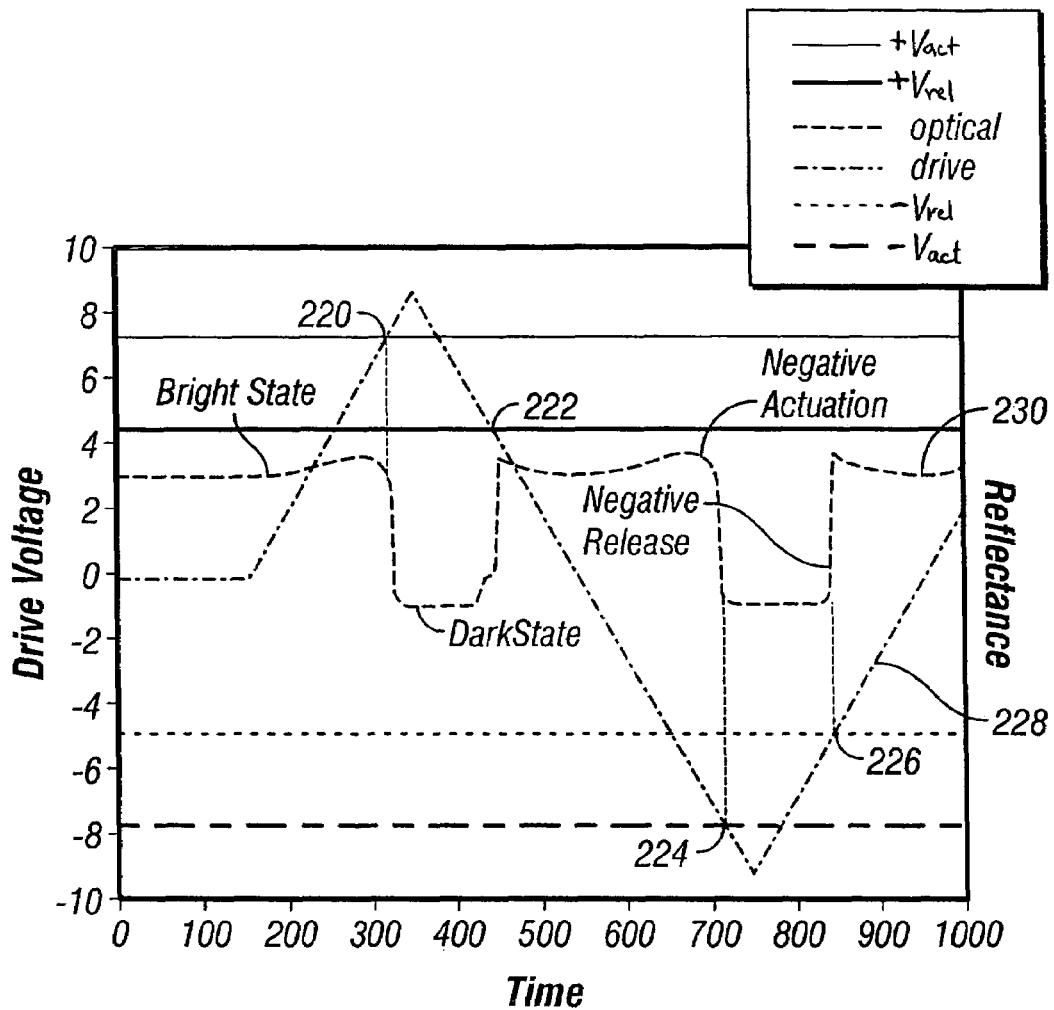
FIG. 12 is a graph illustrating a driving voltage for MEMS interferometric modulators and the resulting reflectance of the modulators.

In some embodiments, one or more memory characteristics of a pixel or region are tested and/or measured by focusing the microscope objective 230 on a single pixel, or a group of pixels, and adjusting the in-line lighting to illuminate that pixel or group. In other embodiments, one or more memory characteristics of the entire array or a large region of the array are tested. In some testing, it may be desirable to "gang" drive the array by, for example, connecting all row leads to ground and all column leads to the same voltage waveform, so that the entire group of pixels or the array can exhibit the uniform reflectance characteristics. FIG. 12 exemplifies the actuation and release characteristics of one embodiment of a gang driven array of interferometric modulators. Here, the memory characteristics are illustrated by driving the array with a voltage waveform 228. Hysteresis occurs because the voltage differential required to actuate the modulators in the array is higher than a voltage required to maintain the modulators in their current state, which in turn is higher than the voltage required to release the modulators in the array. Thus, there is a window of voltages where the array will not change state even when the voltage is changed. FIG. 12 illustrates the drive voltage 228 and the reflectance 230 from the array (e.g., as measured by the photodetector) as a function of time. Alternatively, the response may be depicted as a hysteresis plot as in FIG. 13, which plots reflectivity as a function of drive voltage. A response that does not reveal the expected hysteresis shape of FIG. 13 will be indicative of an anomaly in the pixel or region of the array.

In some embodiments, the response of the interferometric modulators may be characterized by four voltage levels: positive actuation (+Vact), positive release (+Vrel), negative actuation (−Vact), and negative release voltage (−Vrel). These voltage levels themselves are arbitrary as the actual positive actuation voltage, positive release voltage, negative actuation voltage, and negative release voltage will vary depending on the structure of the particular interferometric modulator. These voltage levels may be determined from the plots of FIG. 12 or 13. +Vact 220 corresponds to the voltage at which the MEMS interferometric modulator will be driven from a released state to an actuated state as voltage is increased. +Vrel 222 corresponds to the voltage at which the MEMS interferometric modulator will release from an actuated state when the voltage is decreased. −Vact 224 corresponds to the voltage at which the MEMS interferometric modulator will be driven from a released state to an actuated state as voltage is decreased. −Vrel 226 corresponds to the voltage at which the MEMS interferometric modulator will release from an actuated state when the voltage is increased.

The appropriate parameters for setting up a memory waveform for some testing processes can be determined using these four voltage levels. These parameters include the amplitude of bias (Vbias), the DC offset voltage (Voffset), the memory window (ΔVmem), and the pulse needed to actuate the pixel (Vact). In some embodiments, these parameters can be determined as follows:

$$V_{bias}=[((+Vact++Vrel)/2)-((-Vact+-Vrel)/2)]/2$$

$$V_{offset}=[((+Vact++Vrel)/2)+((-Vact+-Vrel)/2)]/2$$

$$\Delta Vmem=\text{Min}[(+Vact-+Vrel),(-(-Vact--Vrel)]$$

$$Vact=2\times+V_{bias}$$

Figure 13:
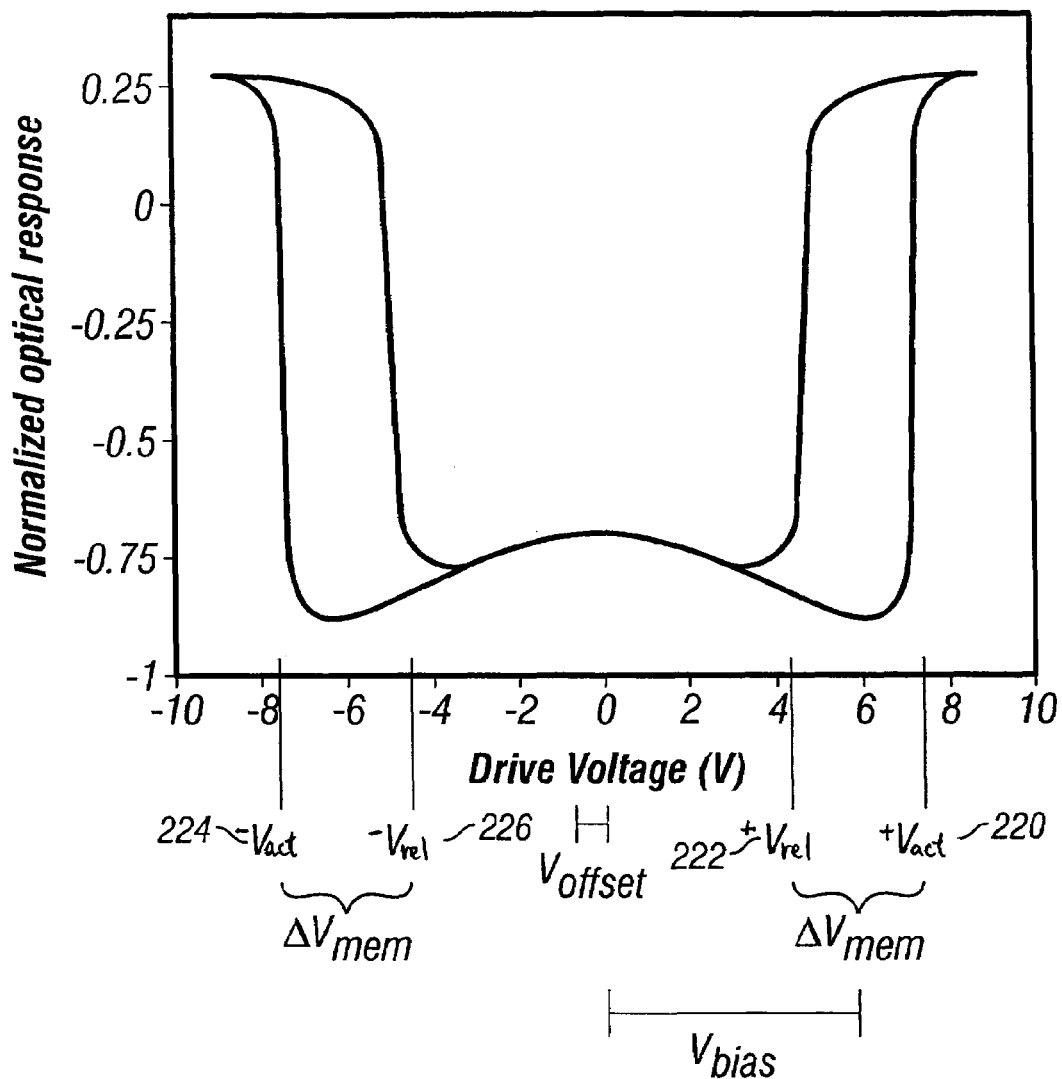
FIG. 13 is a graph illustrating an optical response of a MEMS interferometric modulators.

With reference to FIG. 13, $V_{bias}$ corresponds generally to the voltage that the center of the memory window is offset from the symmetrical center of the hysteresis plot. $V_{offset}$ corresponds generally to the voltage that the symmetrical center is offset from 0V, for example, it is typically calculated as the average of the positive actuation voltage (+Vact) and the negative actuation voltage (−Vact). ΔVmem corresponds to the voltage window in which the state of the interferometric modulator will not change. The actuation voltage corresponds to a potential that will ensure actuation of the interferometric modulator. These parameters may be used to determine the appropriate control voltages for the array under investigation or to determine whether the array will be suitable for the desired application. For example, in a display application, a memory window (ΔVmem) of less than 0.5 V may indicate that the array has failed testing and cannot be used.

Figure 14:
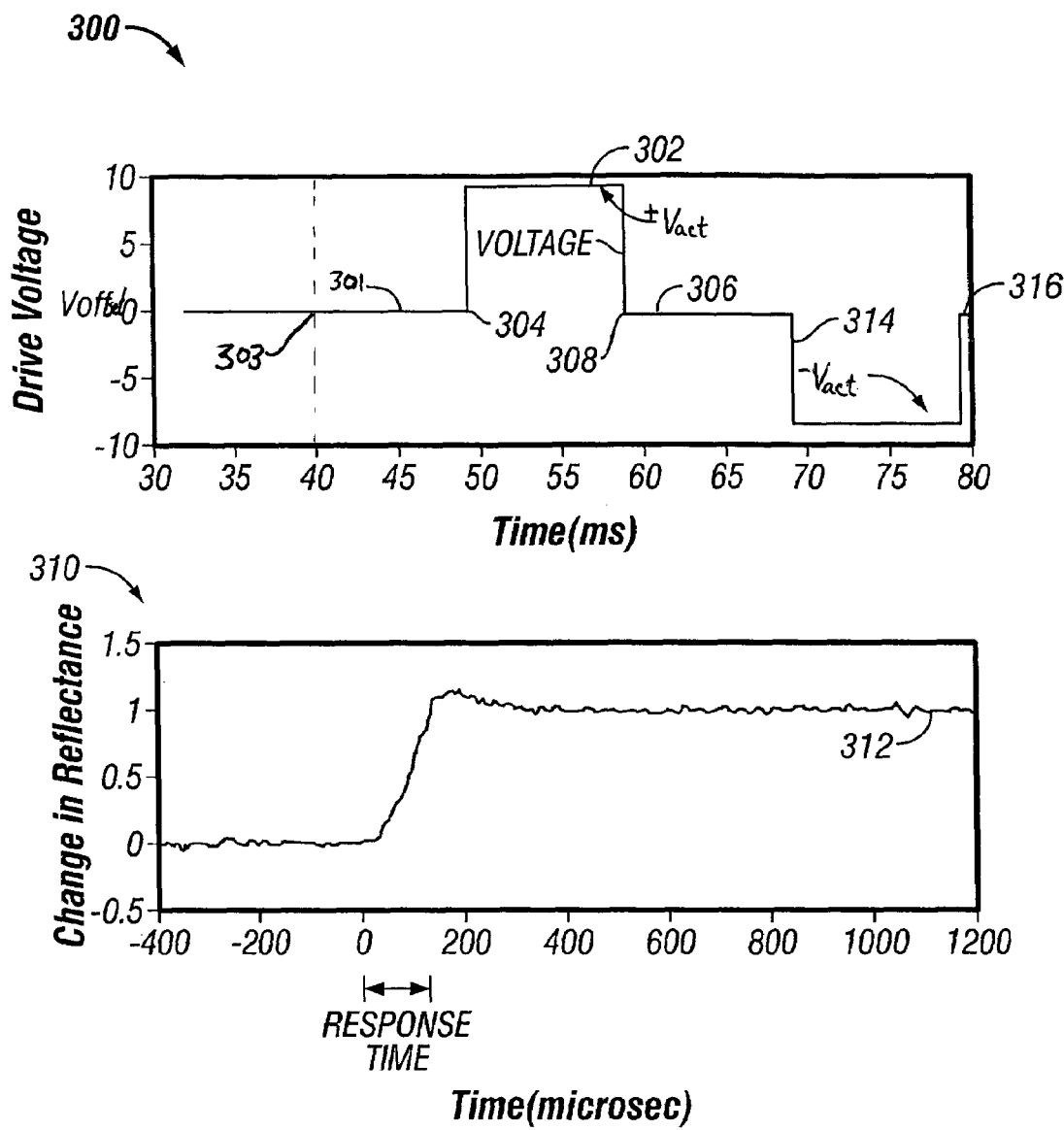
FIG. 14 is a schematic illustrating a another graphical waveform used to drive MEMS interferometric modulator pixels to determine a quality characteristic and a resulting optical response.

In one embodiment, the response time of a pixel or a region (e.g., a portion) of a MEMS interferometric modulator array (both of which are referred to here as "the interferometric modulators") can be measured by asserting a drive voltage step across the interferometric modulators and measuring the reflectance response using a photodetector. FIG. 14 illustrates one example of a voltage waveform that includes such a voltage step. In FIG. 14, plot 300 is a graphical representation illustrating a drive voltage waveform as a function of time. Here, the asserted voltage waveform includes a voltage step 304 from a first voltage level 301 at about the offset voltage (Voff), at which the interferometric modulators are in a released state, to a second voltage level 302 at a positive actuation voltage (Vact). Upon assertion of this voltage step, the interferometric modulators begin to change their reflectance properties from a bright state (released) to a dark state (actuated). If the light reflecting from the interferometric modulators is detected during the application of this voltage step, a response time for positive actuation (Tpa) can be determined by measuring the time it takes for the interferometric modulators to achieve a certain change in reflectivity. The voltage step 308 from a positive actuation voltage level 302 to a release voltage level 306 allows a similar detection of the positive release response time (Tpr). Similarly, the negative actuation (Tna) 314 and negative release (Tnr) 316 response times may be determined by detecting the reflected light while actuating the interferometric modulators with a voltage step at a negative actuation voltage (−Vact), and then while asserting a voltage level 316 which releases the interferometric modulators. The term "offset voltage" may be used to describe the average of the positive actuation voltage (+Vact) and the negative actuation voltage (−Vact), illustrated in FIG. 12. In typical applications for testing response times, the measured response time reflects the slowest response of the tested interferometric modulators.

An example of the reflectance that occurs when interferometric modulators are actuated or released is depicted in the lower plot 310 of FIG. 14. Here, the change in reflectance of the interferometric modulators is shown as a function of time. A measure of the relative change in reflectance can be used to illustrate both the change in reflectance from a bright (released) state to a dark (actuated) state, and the change from a dark state to a bright state. In one embodiment, a response time is defined as the time it takes the reflectance response 312 of the interferometric modulators to reach a certain level of the total reflectance response as triggered by a voltage level change to actuate or release the interferometric modulators.

In one embodiment, a response time is defined as the time it takes the reflectance response 312 of the interferometric modulators to reach 90% of the total reflectance response. In other embodiments, other percentages (or levels) of reflectance less than 90% or greater than 90% can be used. In some embodiments, the response time is repeatedly measured to determine its consistency. The criteria for an acceptable response time may vary depending on the application. For example, for display applications that do not require rapid changes in the picture displayed, a longer response time can be acceptable.

One skilled in the art will recognize that there are many alternative embodiments of the voltage waveform depicted in FIG. 14. Depending on the display application, the preferred embodiment for the response time waveform may be altered to mimic the expected drive signals of the final display. The waveform illustrated in FIG. 14 is one example of a waveform that can be used for determining response times. In some embodiments, only a portion of the waveform is used, for example, a first portion as indicated between numerals 301 and 306 can be used to test the positive actuation and release response times (positive relative to the offset voltage). In some tests, this portion of the waveform can be applied to the interferometric modulators multiple times. In such cases, a period of this portion of the waveform can be defined (e.g., between numerals 303 and 306) and a frequency of applying the waveform portion can also be defined. Similar periods and frequencies can be defined for all the waveforms and/or portions of waveforms described herein. For example, another periodic waveform may be defined between numerals 303 and 316, which includes both the positive actuation and release with the negative actuation and release. In some applications, the waveforms, or portions thereof, are applied to the interferometric modulators at a frequency of about 10 Hz-5000 Hz, depending on the response time being measured.

Figure 15:
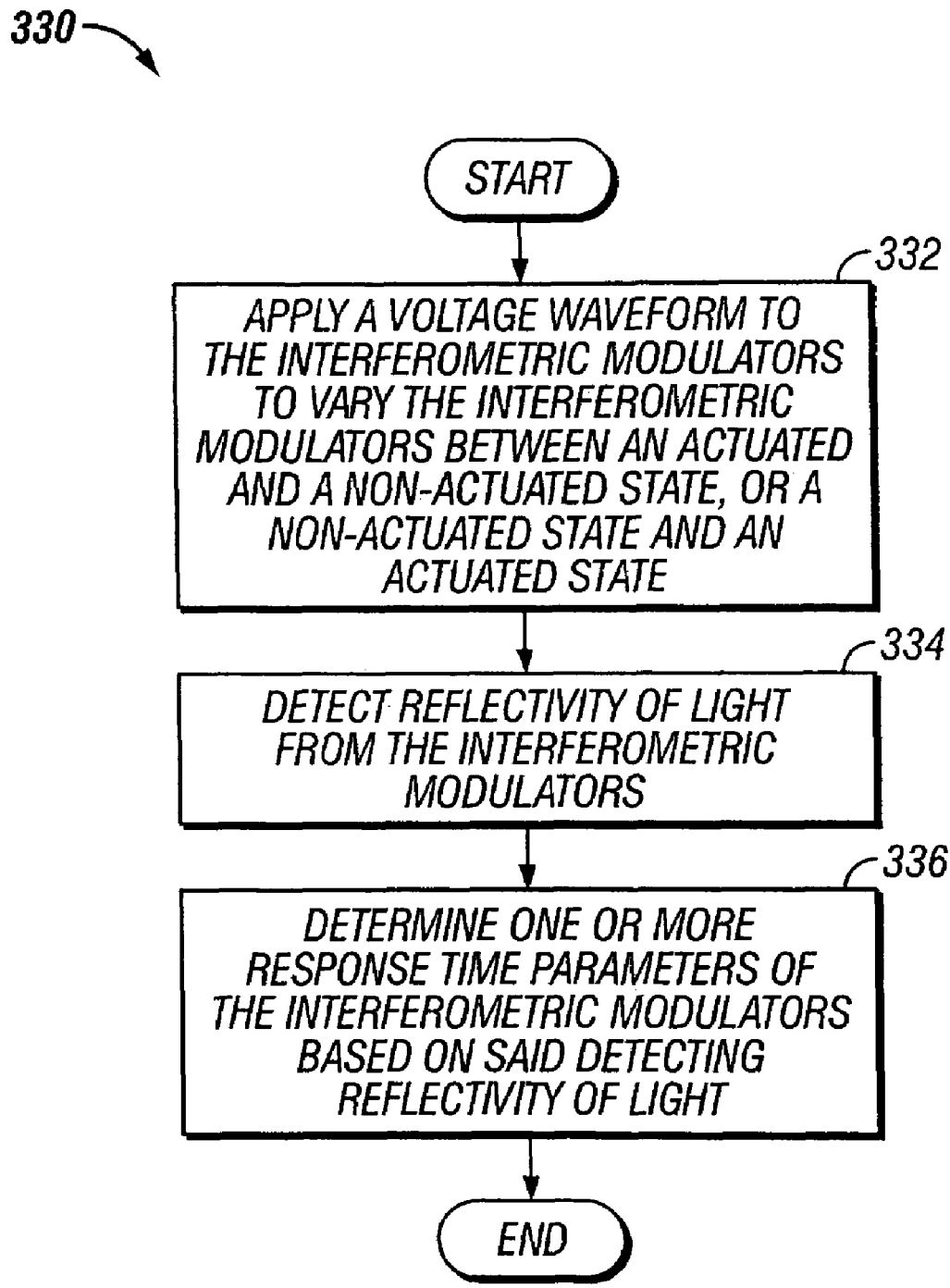
FIG. 15 is a flowchart illustrating a process for determining a response time of MEMS interferometric modulators.

FIG. 15 is a flowchart of a process 330 for determining one or more response time parameters of interferometric modulators. In state 332, a voltage waveform is applied to the array to change the state of the pixels from an actuated state to a released state, or from a released state to an actuated state. To measure a response time, the voltage waveform should be asserted long enough to allow the actuation or release of all the interferometric modulators, that is, the length of time of asserting the voltage should be longer than the response time so that the length of time is not a limiting factor to the response time measurement. In state 334, the reflectivity of the array is measured relative to the time of applying the voltage waveform using a detector. Then, in state 336, the process 330 determines one or more response time parameters of the pixels based on the detected reflectance, for example, as illustrated in FIG. 14, or in FIGS. 16A and 16B. For some response time measurements, an actuation voltage is applied to the interferometric modulators without when they are not subject to a bias voltage (e.g., FIG. 14). Other response time measurements are made by applying an actuation voltage to interferometric modulators that are first subject to a bias voltage (e.g., FIGS. 16A and 16B).

Figures 16A, 16B:
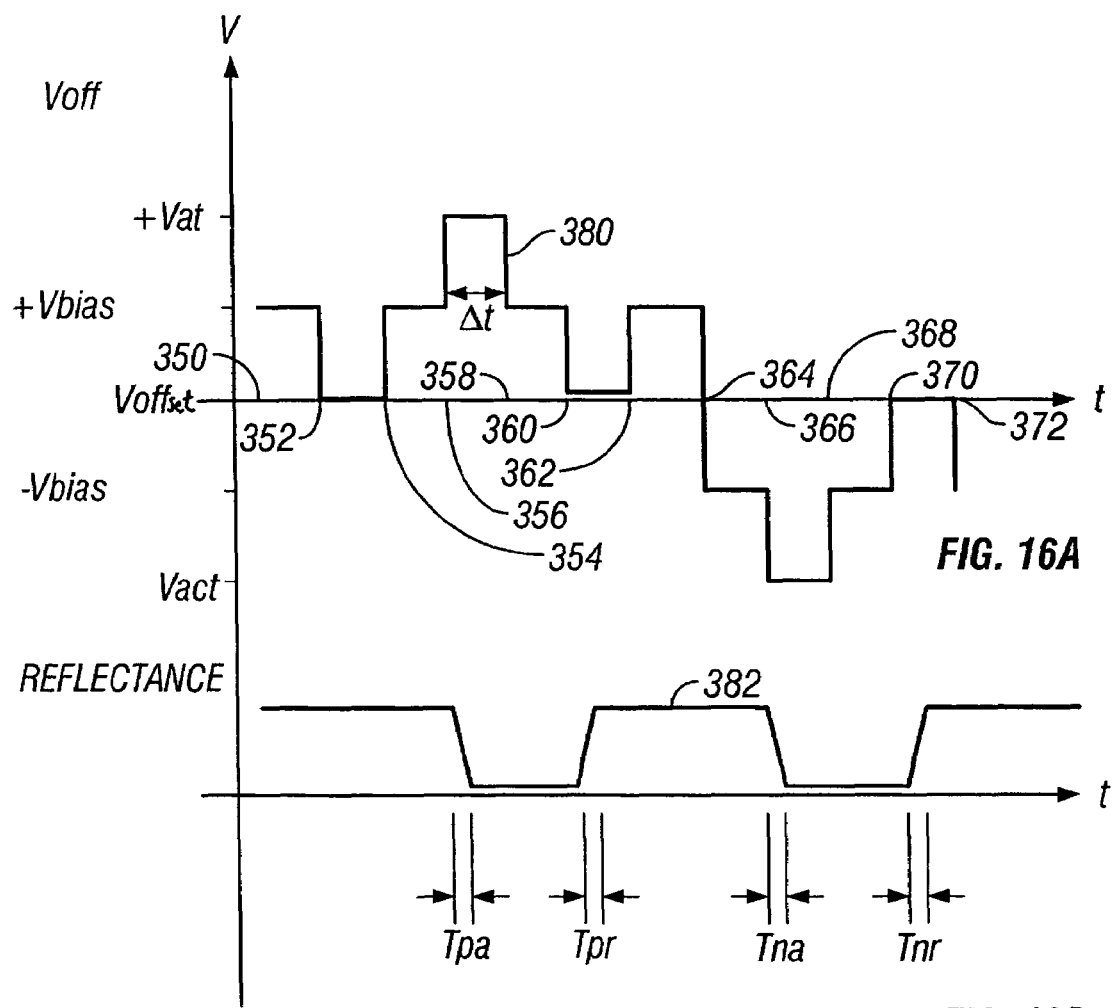
FIG. 16A is a schematic graphically illustrating a waveform used to drive interferometric modulators to determine a response time.
FIG. 16B is a schematic illustrating graphically illustrating an optical response of the interferometric modulators.

FIG. 16A is a graphical representation of a voltage waveform 380, as a function of time, that can be used to drive one or more MEMS interferometric modulators to determine a response time. FIG. 16B is a graphical representation of a corresponding measured reflectance 382 as a function of time from interferometric modulators driven by the voltage waveform 380 shown in FIG. 16A. The voltage waveform 380 is shown centered at an offset voltage, which can be set at different voltage levels in various embodiments of MEMS interferometric modulators and/or drive schemes. Accordingly, the positive and negative bias voltages, and the positive and negative actuation voltages are discussed relative to the offset voltage, and do not imply that the voltages are necessarily positive or negative relative to a ground voltage of zero.

In this embodiment, the actuation and release response times, both positive and negative, are determined for interferometric modulators that are subject to a voltage level that is within the hysteresis window. At time 350, the voltage waveform is at a positive bias voltage (+Vbias) that is within the hysteresis window of the interferometric modulators, the numerals herein relating to time referring to points in time as indicated along the x-axis (time). At time 352 the voltage waveform 380 is set to the voltage offset, and then increased to the positive bias voltage (+Vbias). Setting the voltage at the offset voltage ensures that the pixels are in a released state at time 354. At time 356, the voltage is increased from the bias positive bias voltage (+Vbias) to a positive actuation voltage (+Vact) and held there for a duration of time delta t ($\Delta t$) which extends until time 358. When the actuation voltage is applied, the pixels correspondingly actuate over a discrete time period causing the reflectance of the pixels to change from a bright state to a dark state. The actuation voltage, as well as the bias voltage can vary depending on the configuration of the interferometric modulators. In one example, the positive actuation voltage is about two times the positive bias voltage level, and the negative actuation voltage is about two times the negative bias voltage level.

FIG. 16B illustrates the change in reflectance 382 of the interferometric modulators as a function of time, the time axis of FIG. 16A corresponding with the time axis of FIG. 16B. As illustrated in FIG. 16B, when the interferometric modulators are actuated at time 356, the reflectance changes, and the time during which the reflectance changes is the positive actuation response time (Tpa). The reflectance of the pixels can be measured by using a variety of systems, including one of the systems previously described herein.

In various embodiments, the response can be deemed complete when the reflectance decreases to certain thresholds, such as 90%, 95%, or 99% of the total reflectance response. Different thresholds may be appropriate for the various displays that the pixels may be incorporated into. The thresholds can be predetermined, or dynamically determined based on one or more operating conditions or application requirements. The time period $\Delta t$ during which the actuation voltage is asserted is of a relatively large duration compared to the response time being measured to ensure that any pixel that can actuate will actuate.

At time 360, the voltage is decreased to the offset voltage, which is the release voltage for the pixels. When this occurs, the pixels release and the reflectance of the pixels increases. As illustrated in FIG. 16B, this time period during which the interferometric modulators release is the positive release response time (Tpr). Similarly to the positive actuation response time, the positive release response time can be determined by measuring the time period that it takes for the reflectance of the pixels to reach a certain threshold once the voltage has been set to the offset voltage at time 360.

At time 364 the voltage waveform 380 is set to a negative bias voltage (−Vbias). Then at time 366, the voltage waveform 380 is set to a negative actuation voltage (−Vact) to actuate the interferometric modulators. When the voltage is changed from −Vbias to −Vact at time 366, the pixels are actuated so that they become darker, and the negative actuation response time (Tna) can be determined based on measuring the reflectance of the pixels. When the voltage is changed from −Vbias to the offset voltage at time 370, the pixels are released and their reflectance increases as they change to a bright state. Similarly to the other response time measurements described here, the negative release response time (Tnr) can be determined based on measuring how long it takes for the change in reflectance of the interferometric modulators to reach a certain threshold. FIG. 16B also illustrates the negative actuation time (Tna) and the negative release time (Tna) which corresponds to the negative actuation at time 366 and the negative release at time 370, respectively. The response times determined here are based on the interferometric modulators being operated with hysteresis, for example, the response times are based on changing the voltage from a voltage that is within the hysteresis window, e.g., +Vbias, to a voltage outside the hysteresis window, e.g., +Vact. By actuating and releasing the interferometric modulators when they are subject to a voltage level within the hysteresis window, the pixels are tested under operating conditions that may closer mimic their actual operating conditions.

Figures 17A, 17B:
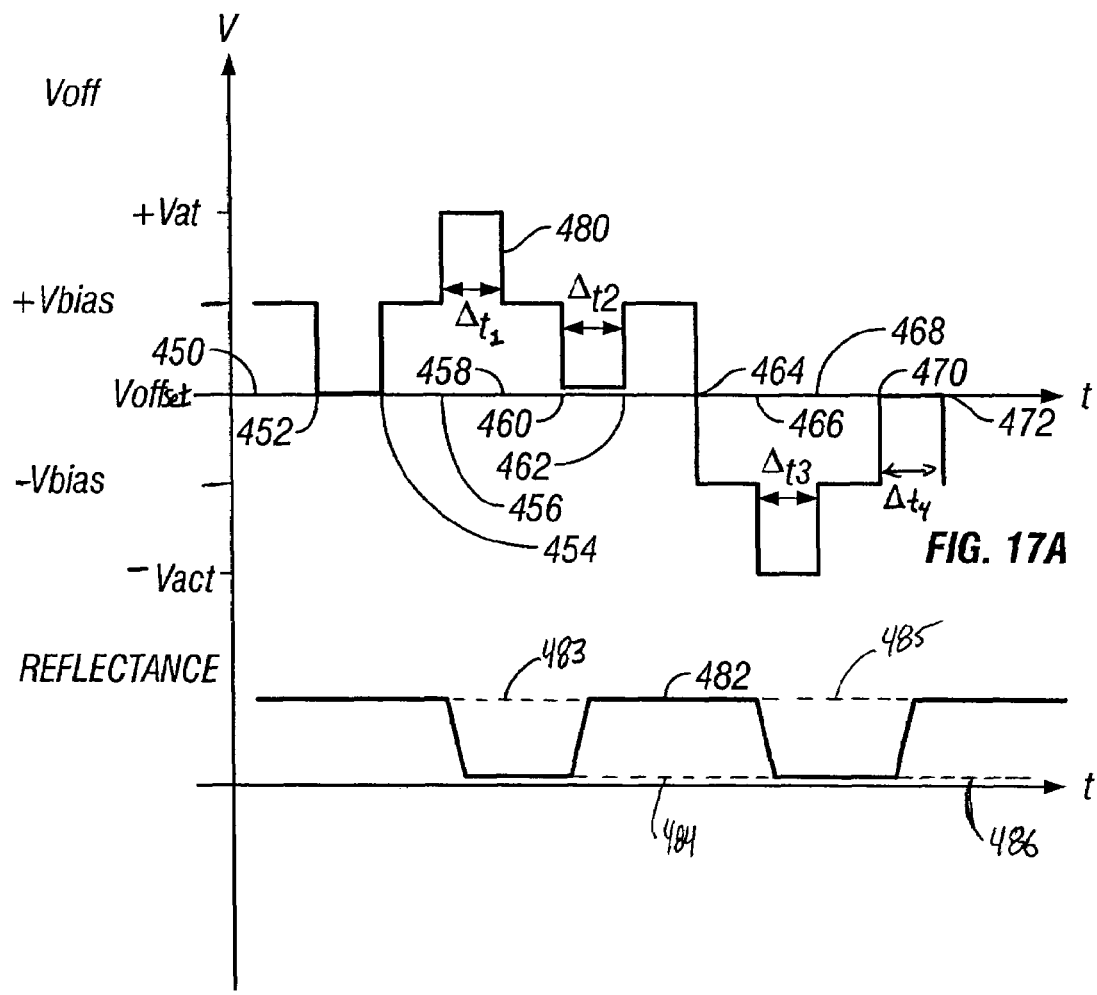
FIG. 17A is a schematic graphically illustrating a waveform used to drive interferometric modulators to determine a response time.
FIG. 17B is a schematic graphically illustrating an optical response of the interferometric modulators.

Referring now to FIGS. 17A and 17B, in another embodiment the actuation and release response times are calculated for MEMS interferometric modulators by varying the length of the time $\Delta t$ of applying the actuation voltage (positive or negative) while monitoring the pixels to determine when they have actuated or released. The time period $\Delta t$ is varied until a minimum time value is determined during which an acceptable number (or percentage) of the pixels are able to actuate (or release) within that minimum time period. This process is referred to herein as the "minimum time line process."

FIG. 17A illustrates a voltage waveform 480 generally similar to the voltage wave 380 shown in FIG. 16A. However, the voltage waveform 480, or a portion thereof (e.g., the positive or negative actuation voltage portion) is applied to the interferometric modulators multiple times, and each time a response time is determined based on detecting light reflecting from the interferometric modulators, as previously described. The length of time during which an actuation voltage is applied can be varied to determine a minimum time to apply the actuation voltage that still allows the interferometers to actuate, illustrated in FIG. 17B by $\Delta t_1$ and $\Delta t_3$. Similarly, the length of time during which a release voltage is applied can be varied to determine a minimum time for applying the release voltage that still allows the interferometers to release, illustrated in FIG. 17B by $\Delta t_2$ and $\Delta t_4$. These minimum times ($\Delta t_1$, $\Delta t_2$, $\Delta t_3$, and $\Delta t_4$) are long enough for the modulators to respond properly to applied voltages. If the time $\Delta t_1$ is too short, the reflectance curve 482 will look like the first dotted line 483 because the modulators are not able to respond to a positive actuation voltage. One procedure is to increase the time $\Delta t_1$ during which an actuation voltage is applied until actuation is observed, for example, either by an observer viewing the actuation or by a measurement system. Similarly, if the time $\Delta t_3$ is too short, the reflectance curve 482 will look like the third dotted line 485 because the modulators did not respond to the negative actuation voltage, and if the times $\Delta t_2$ or $\Delta t_4$ are too short, the reflectance curve 482 will look like the second and fourth dotted lines 484, 485 because the modulators will not respond to the applied respective positive or negative release voltages. These times ($\Delta t_2$, $\Delta t_3$, and $\Delta t_4$) can also be increased until the desired response is observed.

FIG. 17B illustrates on method of using the minimum time line process to determine all response times by analyzing the reflectance verses time plot shown as solid trace 482. The actuation and/or release of the pixels can be detected by various means, including by detecting the reflectance of the pixels using one of the systems described herein, or another suitable system. The perceived or measured actuation or release indicates the actuation or release of the slowest responding interferometric modulator(s). The reflectance is measured to determine if certain reflectance thresholds are met, indicating that certain acceptable percentage of the pixels are actuating or releasing. In some embodiments, the determined acceptable threshold value of the percentage of pixels that actuate and/or release is 90% or higher, and in other embodiments the percentage can be lower than 90%, e.g., 80%.

The minimum time line process is advantageously used to determine pixel response times when the pixels are going to be used in a device that requires fast refresh rates, for example, displaying image data at a video data rate, because it allows for qualitative measurements that can be standardized. Using a standardized value can also facilitate its implementation and various manufacturers.

Figure 18:
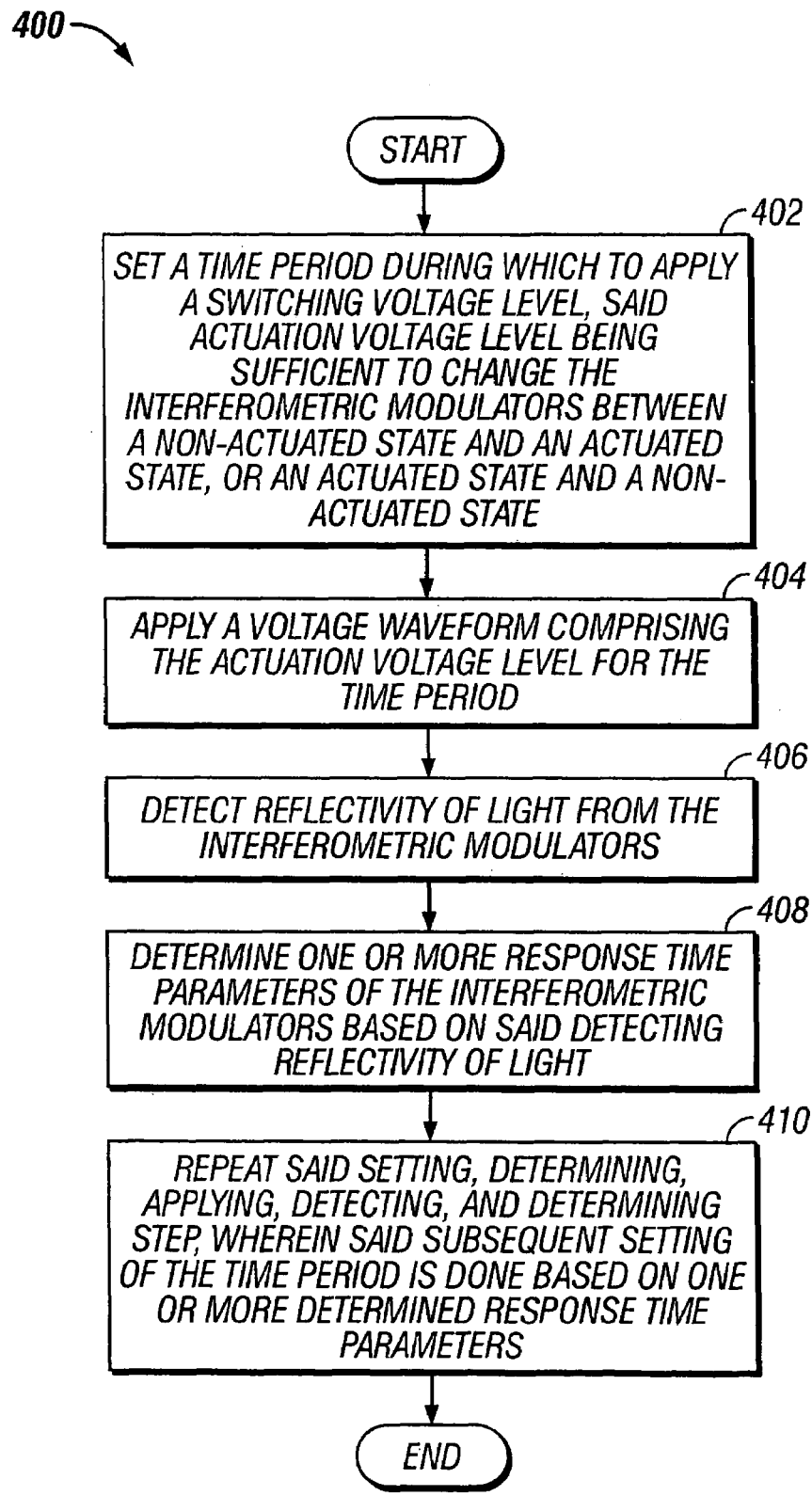
FIG. 18 is a flowchart illustrating a process for determining a minimum response time of MEMS interferometric modulators.

FIG. 18 is a flowchart that illustrates a process 400 of testing a plurality of interferometric modulator pixels. In state 402, the process 400, sets a time period during which to apply an actuation voltage level, the actuation voltage level being sufficient to change the interferometric modulators between a non-actuated state and an actuated state, or an actuated state and a non-actuated state. In state 404 a voltage waveform that includes the actuation voltage for the duration of the time period is applied to the pixels. In state 406, the reflectivity of the pixels is detected and used to determine a sufficient number of pixels are actuated or released. In state 408, a response time parameter of the pixels is determined based on the detected reflected light. Next the process in state 410 repeats the setting, applying, detecting, and determining step to identify a minimum time period where a sufficient number of pixels have actuated or released, wherein said subsequent setting of the time period is done based on one or more determined response time parameters.

As described above, visual observation or a measurement of the reflectance of the interferometric modulators can be used to determine a quality parameter. For example, in some testing the uniformity of the interferometric modulators when they are all driven to an actuation or release state is evaluated, or in other testing the actuation or release response times of the interferometric modulators is determined. In another embodiment, the quality parameter can be determined by using the color response of the interferometric modulators, for example, by using the change in contrast to determine when the interferometric modulators are actuated or released, the uniformity of the actuation or release relative to time, or the actuation or release response times. The color response of the array 120 of interferometric modulators can be detected from the reflected light 130 and measured using a system similar to FIG. 10, where the detector 128 comprises a spectrometer. The system, such as described above, may be adjusted to focus on a single pixel or area of the array 120. It may be advantageous when testing a single pixel that holes, posts, and any masking in the array not be included in the test area. In one embodiment, the array is connected to a gang drive, such as described above.

Color measurements can then be made under a variety of stimulus waveforms. In one embodiment, the interferometric modulators are measured in both an undriven state and under a driving memory waveform, such as described above. Both bright and dark states under the driving memory waveform may be spectrally measured. Color information collected from reflected light 130 may be converted to color parameters, for example, the X, Y, Z CIE color tri-stimulus values. Because Y in the X, Y, Z CIE color tri-stimulus values contains all luminance information, the ratio of Ybright (e.g., non-actuated) to Ydark (e.g., actuated) provides a contrast ratio for contrast characterization, which can be used to determine a measure of uniformity similarly to reflectance. In some embodiments, one or more of the color measurements are made separately. In some embodiments, this measurement is performed by illuminating the interferometric modulators with different colored illumination sources and measuring the light reflected by each source. In other embodiments, the reflected light passes through a predetermined filter to select the desired wavelength to be measured.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed:

1. A method of testing a plurality of interferometric modulators, the method comprising:
    applying a voltage waveform to the interferometric modulators to change the state of the interferometric modulators between an actuated and a released state, or a released state and an actuated state;
    detecting light reflected from the interferometric modulators as a function of time while applying said voltage waveform; and
    determining at least one response time parameters of the interferometric modulators based on said detecting, wherein the at least one parameter comprises one of the following: a positive actuation response time (Tpa), a negative actuation response time (Tna), a positive release response time (Tpr), and a negative release response time (Tnr).

2. The method of claim 1, wherein said applying comprises applying the voltage waveform at a frequency of between 10 Hz and 5000 Hz.

3. The method of claim 2, wherein said applying comprises applying the voltage waveform at a frequency of between 50 Hz and 500 Hz.

4. The method of claim 3, wherein said applying comprises applying the voltage waveform at a frequency of between 50 Hz and 150 Hz.

5. The method of claim 4, wherein said applying comprises applying the voltage waveform at a frequency of about 100 Hz.

6. The method of claim 1, wherein the waveform is applied simultaneously to all interferometric modulators.

7. The method of claim 1, wherein said detecting comprises detecting the light reflected from less than all interferometric modulators.

8. The method of claim 1, wherein said detecting comprises measuring the reflected light with a photodetector.

9. The method of claim 1, wherein said detecting comprises measuring the reflected light through a diffuser positioned in front of the interferometric modulators.

10. The method of claim 1, wherein said detecting comprises measuring the reflected light at an angle that is substantially perpendicular to the interferometric modulators.

11. The method of claim 1, wherein the voltage waveform comprises a first portion at about an offset voltage level and a second portion at an actuation voltage level.

12. The method of claim 1, wherein the amplitude of the waveform is less than about 2 times the voltage necessary to cause an actuation of the interferometric modulators.

13. The method of claim 12, wherein the amplitude of the waveform is about 1.25 times the voltage necessary to cause an actuation of the interferometric modulators.

14. The method of claim 1, wherein the voltage waveform comprises a first portion at an actuation voltage level and a second portion at about an offset voltage level.

15. The method of claim 1, wherein the response time parameters are based on the slowest response time of one or more of the plurality of interferometric modulators.

16. The method of claim 1, wherein each of the plurality of interferometric modulators comprises a fixed reflective surface and a moveable reflective surface wherein the fixed reflective surface and the moveable reflective surface are configured to cause interference of light.

17. A system for testing a plurality of interferometric modulators, comprising:
    an illumination source adapted to provide incident light to a plurality of interferometric modulators;
    a voltage source configured to apply a voltage waveform to the interferometric modulators to vary the interferometric modulators between an actuated and a released state, or a released state and an actuated state;
    an optical detector configured to detect light reflected from the plurality of interferometric modulators and produce a signal corresponding to the detected light; and
    a computer configured to receive the signal from the optical detector and determine at least one response time parameters of the interferometric modulators based on the signal, wherein the at least one parameter comprises one of the following: a positive actuation response time (Tpa), a negative actuation response time (Tna), a positive release response time (Tpr), and a negative release response time (Tnr).

18. The system of claim 17, wherein said voltage source is further configured to apply the voltage waveform at a frequency of between 10 Hz and 5000 Hz.

19. The system of claim 18, wherein said voltage source is further configured to apply the voltage waveform at a frequency of between 50 Hz and 500 Hz.

20. The system of claim 17, wherein said voltage source is further configured to apply the voltage waveform at a frequency of between 50 Hz and 150 Hz.

21. The system of claim 17, wherein the waveform is applied simultaneously to all interferometric modulators.

22. The system of claim 17, wherein said optical detector is further configured to detect the reflected light with a photodetector.

23. The system of claim 17, wherein said optical detector is further configured to detect the reflected light by measuring the reflected light through a diffuser positioned in front of the interferometric modulators.

24. The system of claim 17, wherein said optical detector is further configured to detect the reflected light by measuring the reflected light at an angle that is substantially perpendicular to the interferometric modulators.

25. The system of claim 17, wherein said computer receives a signal from said voltage source indicating when a voltage is applied to the interferometric modulators.

26. The system of claim 17, wherein the one or more response time parameters are based on the slowest response time of one or more of the plurality of interferometric modulators.

27. The system of claim 17, wherein each of the plurality of interferometric modulators comprises a fixed reflective surface and a movable reflective surface wherein the fixed reflective surface and the movable reflective surface are configured to cause interference of light.

28. A system for testing a plurality of interferometric modulators, comprising:
   means for providing light to the plurality of interferometric modulators;
   means for applying a voltage waveform to the interferometric modulators to vary the interferometric modulators between an actuated and a released state, or a released state and an actuated state;
   means for detecting light reflected from the plurality of interferometric modulators;
   means for producing a signal corresponding to the detected light; and
   means for determining at least one response time parameters of the interferometric modulators based on the signal, wherein the at least one parameter comprises one of the following: a positive actuation response time (Tpa), a negative actuation response time (Tna), a positive release response time (Tpr), and a negative release response time (Tnr).

29. The system of claim 28, wherein the light providing means comprises a broad-band light source.

30. The system of claim 28, wherein the voltage applying means comprises a voltage source.

31. The system of claim 28, wherein the detecting means comprises an optical detector.

32. The system of claim 28, wherein the detecting means comprises a spectrometer.

33. The system of claim 28, wherein the signal producing means comprises an optical detector.

34. The system of claim 28, wherein the determining means comprises a computer configured to receive the signal from the detecting means.

35. The system of claim 28, wherein the one or more response time parameters are based on the slowest response time of one or more of the plurality of interferometric modulators.

36. The system of claim 28, wherein each of the plurality of interferometric modulators comprises a fixed reflective surface and a movable reflective surface wherein the fixed reflective surface and the movable reflective surface are configured to cause interference of light.

37. A method of testing a plurality of interferometric modulators, the method comprising:
   applying a voltage waveform to the interferometric modulators to vary the interferometric modulators between an actuated state and a released state, or a released state and an actuated state wherein the voltage applied to change the state of the interferometric modulators is applied while the interferometric modulators are subject to a bias voltage;
   detecting light reflected from the interferometric modulators while applying the voltage waveform; and
   determining at least one response time parameters of at least a portion of the interferometric modulators based on said detecting the reflected light, wherein the at least one parameter comprises one of the following: a positive actuation response time (Tpa), a negative actuation response time (Tna), a positive release response time (Tpr), and a negative release response time (Tnr).

38. The method of claim 37, wherein the one or more response time parameters are based on the slowest actuation time of one or more interferometric modulators.

39. The method of claim 37, wherein said voltage waveform comprising a first portion a voltage level to place the interferometric modulators in an actuated state, a second portion at a bias voltage level and a third portion at a voltage level sufficient to release the interferometric modulators.

40. The method of claim 37, wherein said voltage waveform comprising a first portion a voltage level to place the interferometric modulators in a released state, a second portion at a bias voltage level and a third portion at a voltage level sufficient to actuate the interferometric modulators.

41. The method of claim 37, wherein each of the plurality of interferometric modulators comprises a fixed reflective surface and a movable reflective surface wherein the fixed reflective surface and the movable reflective surface are configured to cause interference of light.

42. A system of testing a plurality of interferometric modulators comprising:
   a voltage source configured to apply a voltage waveform to the interferometric modulators to vary the interferometric modulators between an actuated and a released state, or a released state and an actuated state,
   a light source positioned to illuminate the interferometric modulators;
   a detector disposed to receive light from the interferometric modulators and produce a corresponding signal; and
   a computer configured to receive the signal from the detector and determine, based on the signal, at least one response time parameters of at least a portion of the interferometric modulators during application of an actuation voltage or a release voltage, wherein the at least one parameter comprises one of the following: a positive actuation response time (Tpa), a negative actuation response time (Tna), a positive release response time (Tpr), a negative release response time (Tnr).

43. The system of claim 42, wherein the one or more response parameters are based on the slowest actuation time of one or more interferometric modulators.

44. The system of claim 42, wherein each of the plurality of interferometric modulators comprises a fixed reflective surface and a movable reflective surface wherein the fixed reflective surface and the movable reflective surface are configured to cause interference of light.

45. A system for testing a plurality of interferometric modulators comprising:
   means for applying a voltage waveform to the interferometric modulators to vary the interferometric modulators between an actuated and a released state, or a released state and an actuated state;
   means for illuminating the interferometric modulators;
   means for sensing light reflected from the interferometric modulators and producing a corresponding signal; and
   means for determining, based on the signal, at least one response time parameters of the interferometric modulators during application of an actuation voltage or a release voltage, wherein the at least one parameter comprises one of the following: a positive actuation response time (Tpa), a negative actuation response time (Tna), a positive release response time (Tpr), and a negative release response time (Tnr).

46. The system of claim 45, wherein the one or more response time parameters are based on the slowest actuation time of one or more interferometric modulators.

47. The system of claim 45, wherein said applying means comprises a controllable voltage source.

48. The system of claim 45, wherein said illuminating means comprises a light source.

49. The system of claim 45, wherein said sensing means comprises a photo detector.

50. The system of claim 45, wherein said determining means comprises a computer.

51. The system of claim 45, wherein each of the plurality of interferometric modulators comprises a fixed reflective surface and a movable reflective surface wherein the fixed reflective surface and the movable reflective surface are configured to cause interference of light.

52. A method of manufacturing a system for testing a plurality of interferometric modulators comprising:
   providing a voltage source configured to apply a voltage waveform to the interferometric modulators to vary the interferometric modulators between an actuated and a released state, or released state and an actuated state;
   positioning a light source to illuminate the interferometric modulators;
   positioning a detector to receive light reflected from the interferometric modulators and produce a corresponding signal; and
   coupling a computer to the detector, the computer configured receive the signal from the detector to determine, based on the signal, at least one response time parameters of the interferometric modulators during application of an actuation voltage or a release voltage, wherein the at least one parameter comprises one of the following: a positive actuation response time (Tpa), a negative actuation response time (Tna), a positive release response time (Tpr), and a negative release response time (Tnr).

53. The method of claim 52, wherein each of the plurality of interferometric modulators comprises a fixed reflective surface and a movable reflective surface wherein the fixed reflective surface and the movable reflective surface are configured to cause interference of light.

54. A method of testing a plurality of interferometric modulators, the method comprising:
   setting a time period during which to apply a switching voltage level, said switching voltage level being sufficient to change the interferometric modulators between a released state and an actuated state, or an actuated state and a released state;
   applying a voltage waveform comprising the switching voltage level for the time period;
   detecting light reflected from the interferometric modulators;
   determining one or more response time parameters of the interferometric modulators based on said detecting; and
   repeating said setting, applying, detecting, and determining step to identify a minimum time period during which a threshold value is achieved, the threshold value indicated a pre-determined number of pixels have actuated or released.

55. The method of claim 54, wherein the one or more response time parameters are based on the slowest actuation time of one or more interferometric modulators.

56. The method of claim 54, wherein the voltage applied to charge the state of the interferometric modulators is applied while the interferometric modulators are subject to a bias voltage.

57. The method of claim 54, wherein said detecting reflected light comprises visual analysis.

58. The method of claim 54, wherein said detecting reflected light comprises receiving the light in an optical system and measuring contrast.

59. The method of claim 54, wherein determining one or more response time parameters comprises determining an actuation response time.

60. The method of claim 54, wherein determining one or more response time parameters comprises determining a release response time.

61. The method of claim 54, wherein each of the plurality of interferometric modulators comprises a fixed reflective surface and a movable reflective surface wherein the fixed reflective surface and the movable reflective surface are configured to cause interference of light.

62. A system for testing a plurality of interferometric modulators, comprising:
   a computer configured to determine a time period during which to apply a switching voltage level, said switching voltage level being sufficient to change a predetermined number of interferometric modulators between a released state and an actuated state, or an actuated state and a released state;
   a voltage source controlled by said computer, said voltage source configured to apply a voltage waveform comprising the switching voltage level for the time period;
   a light source positioned to illuminate the interferometric modulators; and
   a detector positioned to receive light reflecting from the interferometric modulators and produce a signal corresponding to the received light,
   wherein said computer is configured to receive the signal from the detector, and based on the signal, to iteratively vary the length of time for applying the voltage waveform to identify a minimum time period during which the number of pixels have actuated or released during the determined time period meets a threshold value, and to determine one or more response time parameters based on the identical minimum time period.

63. The system of claim 62, wherein the one or more response time parameters are based on the slowest actuation time or release time of one or more interferometric modulators.

64. The system of claim 62, wherein each of the plurality of interferometric modulators comprises a fixed reflective surface and a movable reflective surface wherein the fixed reflective surface and the movable reflective surface are configured to cause interference of light.

65. A system for testing a plurality of interferometric modulators, comprising:
   means for determining a time period during which to apply a switching voltage level, said switching voltage level being sufficient to change the interferometric modulators between a non-actuated state and an actuated state, or an actuated state and a non-actuated state;
   means for applying a controlled by said computer, said voltage source configured to apply a voltage waveform comprising the switching voltage level for the time period;
   means for illuminating the interferometric modulators; and
   means for sensing light reflected from the interferometric modulators and produce a signal corresponding to the received light,
   wherein said determining means receives the signal from the sensing means and determines one or more response time parameters based on the signal, and said determining a time period means is further configured to iteratively control the application of a voltage waveform for a determined time period to identify a minimum time period where the number of pixels have actuated or released during the determined time period meets a threshold value.

66. The system of claim 65, wherein the one or more response time parameters are based on the slowest actuation time or release time of one or more interferometric modulators.

67. The system of claim 65, wherein said determining means comprises a computer.

68. The system of claim 65, wherein said applying means comprises a voltage source.

69. The system of claim 65, wherein said illuminating means comprises a light source.

70. The system of claim 65, wherein said sensing means comprises a photo detector.

71. The system of claim 65, wherein each of the plurality of interferometric modulators comprises a fixed reflective surface and a movable reflective surface wherein the fixed reflective surface and the movable reflective surface are configured to cause interference of light.

72. A method of manufacturing a system for testing a plurality of interferometric modulators, comprising:

providing a computer configured to determine a time period during which to apply a switching voltage level, said switching voltage level being sufficient to change the interferometric modulators between a released state and an actuated state, or an actuated state and a released state;

coupling a voltage source said computer, said voltage source configured to apply a voltage waveform comprising the switching voltage level for the time period;

positioning a light source to illuminate the interferometric modulators; and positioning a detector to receive light reflecting from the interferometric modulators and produce a signal corresponding to the received light, wherein said computer is configured to receive the signal from the detector, and based on the signal, to iteratively vary the length of time for applying the voltage waveform to identify a minimum time period during which the number of pixels have actuated or released during the determined time period meets a threshold value and to determine one or more response time parameters based on the identical minimum time period.

73. The method of claim 72, wherein each of the plurality of interferometric modulators comprises a fixed reflective surface and a movable reflective surface wherein the fixed reflective surface and the movable reflective surface are configured to cause interference of light.

* * * * *